United States Patent
Byun et al.

(10) Patent No.: US 10,397,912 B2
(45) Date of Patent: Aug. 27, 2019

(54) METHOD FOR REDUCING TRANSMISSION RESOURCE OF CONTROL CHANNEL IN SHORT TTI, AND DEVICE USING SAME

(71) Applicant: LG Electronics Inc., Seoul (KR)

(72) Inventors: Ilmu Byun, Seoul (KR); Heejeong Cho, Seoul (KR); Genebeck Hahn, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 15/555,162

(22) PCT Filed: Oct. 14, 2015

(86) PCT No.: PCT/KR2015/010856
§ 371 (c)(1),
(2) Date: Sep. 1, 2017

(87) PCT Pub. No.: WO2016/143968
PCT Pub. Date: Sep. 15, 2016

(65) Prior Publication Data
US 2018/0049165 A1 Feb. 15, 2018

Related U.S. Application Data

(60) Provisional application No. 62/132,456, filed on Mar. 12, 2015, provisional application No. 62/135,717, (Continued)

(51) Int. Cl.
*H04W 72/04* (2009.01)
*H04B 7/26* (2006.01)
(Continued)

(52) U.S. Cl.
CPC ............ *H04W 72/042* (2013.01); *H04B 7/26* (2013.01); *H04L 5/0053* (2013.01); *H04W 72/04* (2013.01);
(Continued)

(58) Field of Classification Search
CPC ........... H04W 72/042; H04W 72/0446; H04W 72/04; H04W 72/0473; H04W 76/27; H04L 5/0053; H04L 5/0007; H04B 7/26
See application file for complete search history.

(56) References Cited

U.S. PATENT DOCUMENTS

2014/0071954 A1* 3/2014 Au .................... H04W 72/0446
370/336
2014/0226607 A1 8/2014 Holma et al.
2017/0303250 A1* 10/2017 Shao ....................... H04L 51/00

FOREIGN PATENT DOCUMENTS

JP 2006-352379 A 12/2006
WO 2014-060010 A1 4/2014

OTHER PUBLICATIONS

QUALCOMM Europe, "TTI for E-UTRA—UL Link Level Analysis", R1-062035, 3GPP TSG RAN WG1 #46, Tallinn, Estonia, Aug. 23, 2006.
(Continued)

*Primary Examiner* — Jackie Zuniga Abad
(74) *Attorney, Agent, or Firm* — Dentons US LLP

(57) ABSTRACT

Provided are a method and a device for reducing a transmission resource of a control channel in a short TTI in a wireless communication system. Specifically, a plurality of first downlink channels which are received during an sTTI and are included in a subframe corresponding to one TTI, and a second downlink channel received during a TTI are received. Further, information on a resource block used for the plurality of first downlink channels is obtained by using a resource block indicator transmitted to a downlink control channel of a control region comprising the first symbol of a subframe. The plurality of first downlink channels are demodulated by using the information, and the second downlink channel is demodulated by using the downlink control channel.

9 Claims, 30 Drawing Sheets

Related U.S. Application Data filed on Mar. 20, 2015, provisional application No. 62/161,871, filed on May 14, 2015.

(51) Int. Cl.
  *H04L 5/00* (2006.01)
  *H04W 76/27* (2018.01)

(52) U.S. Cl.
  CPC ....... *H04W 72/0446* (2013.01); *H04L 5/0007* (2013.01); *H04W 72/0473* (2013.01); *H04W 76/27* (2018.02)

(56) References Cited

OTHER PUBLICATIONS

HTC Corporation, "NDI Consideration for TTI Bundling", R2-091424, 3GPP TSG-RAN WG2 #65, Athens, Greek, Feb. 3, 2009.

* cited by examiner

FIG.23

| DCI Format 9 | DL sTTI subband designation | $L_{DL}$ | UL sTTI subband designation | $L_{UL}$ | UL contention-based resource allocation |

FIG.24

| DCI Format 9 | $F_{DL}$ | DL sTTI subband designation | $L_{DL}$ | UL sTTI subband designation | $L_{UL}$ | UL contention-based resource allocation |

METHOD FOR REDUCING TRANSMISSION RESOURCE OF CONTROL CHANNEL IN SHORT TTI, AND DEVICE USING SAME

CROSS-REFERENCE TO RELATED APPLICATIONS

This application is the National Stage filing under 35 U.S.C. 371 of International Application No. PCT/KR2015/010856, filed on Oct. 14, 2015, which claims the benefit of U.S. Provisional Applications No. 62/132,456 filed on Mar. 12, 2015, No. 62/135,717 filed on Mar. 20, 2015, and No. 62/161,871 filed on May 14, 2015, the contents of which are all hereby incorporated by reference herein in their entirety.

BACKGROUND OF THE INVENTION

Field of the Invention

The present invention relates to wireless communication and, more particularly, to a method for reducing transmission resources for a control channel in a short TTI (sTTI) in a wireless communication system, and to a device using such a method.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present invention provides a method for reducing transmission resources for a control channel in a short TTI in a wireless communication system and a device using such a method.

Embodiments provides a method for performing communication using a plurality of control channels and a plurality of data channels in a wireless communication system, wherein the control channels and data channels are delivered using a plurality of symbols.

First, terminologies will be defined. Each first downlink channel includes a sPDSCH that is received during a sTTI (short TTI) and a sPDCCH that schedules the sPDSCH. A second downlink channel corresponds to a conventional PDSCH received during a conventional TTI. A downlink control channel corresponds to a common PDCCH in the conventional TTI. Demodulating a channel corresponds to decoding a channel.

In this method, a plurality of the first downlink channels included in a subframe corresponding to one conventional TTI and received during the sTTI are received, and the second downlink channel received during the conventional TTI is received. The plurality of the first downlink channels are received sequentially. That is, in the first sTTI, second sTTI, and third sTTI in this order, the first downlink channels are received.

In this method, information on a resource block used for a plurality of the first downlink channels is obtained by using a resource-block indicator transmitted on the downlink control channel of a control region including a first symbol of the subframe. The resource-block indicator indicates a resource block using which the sPDCCH including resource allocation information for a specific user equipment is transmitted. That is, the indicator indicates the number of bits for resource allocation in the sPDCCH. Furthermore, the resource-block indicator is included in the DCI field included in the common PDCCH. Thus, the indicator may be considered to be transmitted on the downlink control channel A DCI field of the common PDCCH indicates a resource block using which the plurality of the first downlink channels are transmitted. The DCI field indicates the resource blocks transmitted during all sTTIs for all terminal devices as well as the specific terminal device itself.

The method may include receiving a Radio Resource Control (RRC) message to determine a rule by which the resource block is indicated by the resource-block indicator.

In the method, subsequently, the plurality of the first downlink channels are demodulated using the information about the resource block used for the first downlink channels. This means that the terminal device may demodulate its sPDCCH using the resource-block indicator and, thus, demodulate the sPDSCH. Further, the second downlink channel is demodulated using the downlink control channel. This means that the common PDCCH of the conventional TTI may be used to demodulate the PDSCH of the conventional TTI.

Further, the sPDCCH includes MCS or TPC information, and the sPDCCH received at a predetermined time point indicates only the change amount of MCS or TPC information. This is a method of reducing the amount of information bits of the sPDCCH itself, rather than the method of using the common PDCCH. That is, if the total information of the MCS/TPC is informed every sTTI, the resource waste is severe. Thus, accurate MCS/TPC information is informed at a specific period, and only the change value (delta) is informed at the remaining periods.

Each of the first downlink channels is received using the same number of symbols. The present embodiments may not be limited to a sTTI structure with two OFDM symbols.

Each of the symbols includes an Orthogonal Frequency Division Multiplexing (OFDM) symbol or an SC-FDMA (Single-Carrier Frequency Division Multiple Access) symbol.

Further, embodiments provide a receiving device for performing communication using a plurality of control channels and a plurality of data channels in a wireless communication system, wherein the control channels and data channels are delivered using a plurality of symbols.

The device may include a radio frequency (RF) unit configured to transmit and receive a radio signal; and a processor coupled to the RF unit, wherein the processor is configured: to receive a plurality of first downlink channels and a second downlink channel, wherein the plurality of first downlink channels are included in a subframe corresponding to one transmission time interval (TTI) and are received during a short TTI (sTTI), wherein the second downlink channel is received during the TTI, wherein the plurality of first downlink channels are received sequentially.

The processor may be further configured to acquire information on a resource block used for the plurality of first downlink channels, using a resource-block indicator transmitted on a downlink control channel of a control region including a first symbol of the subframe. The resource-block indicator indicates a resource block using which the sPDCCH including resource allocation information for a specific user equipment is transmitted. That is, the indicator indicates the number of bits for resource allocation in the sPDCCH. Furthermore, the resource-block indicator is included in the DCI field included in the common PDCCH. Thus, the indicator may be considered to be transmitted on the downlink control channel A DCI field of the common PDCCH indicates a resource block using which the plurality of the first downlink channels are transmitted. The DCI field indicates the resource blocks transmitted during all sTTIs for all terminal devices as well as the specific terminal device itself.

The processor may be further configured to demodulate the first downlink channels using the acquired information. This means that the terminal device may demodulate its sPDCCH using the resource-block indicator and, thus, demodulate the sPDSCH. The processor may be further configured to demodulate the second downlink channel using the downlink control channel. This means that the common PDCCH of the conventional TTI may be used to demodulate the PDSCH of the conventional TTI.

Using the proposed method, the amount of the sCR resources for control signal transmission may be reduced by reducing the transmission resources for the sPDCCH in the sTTI. This realizes an increase in the transmission resources for the sPDSCH in the sTTI, thereby allowing more data to be transmitted in the sTTI.

BRIEF DESCRIPTION OF THE DRAWINGS

FIG. 23 shows an example of a DCI format of a common PDCCH in a conventional TTI including sTTIs.

FIG. 24 shows an example of a DCI format of a common PDCCH in a conventional TTI including sTTIs.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
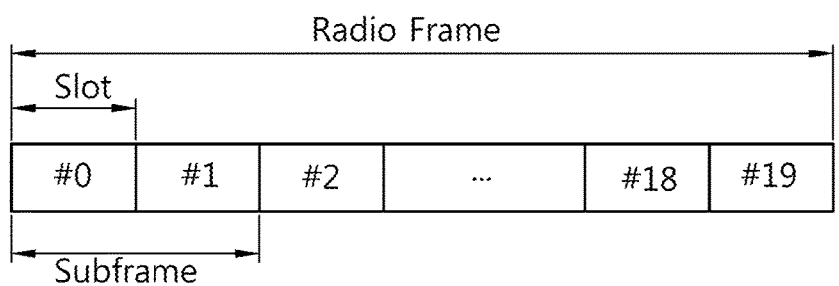
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
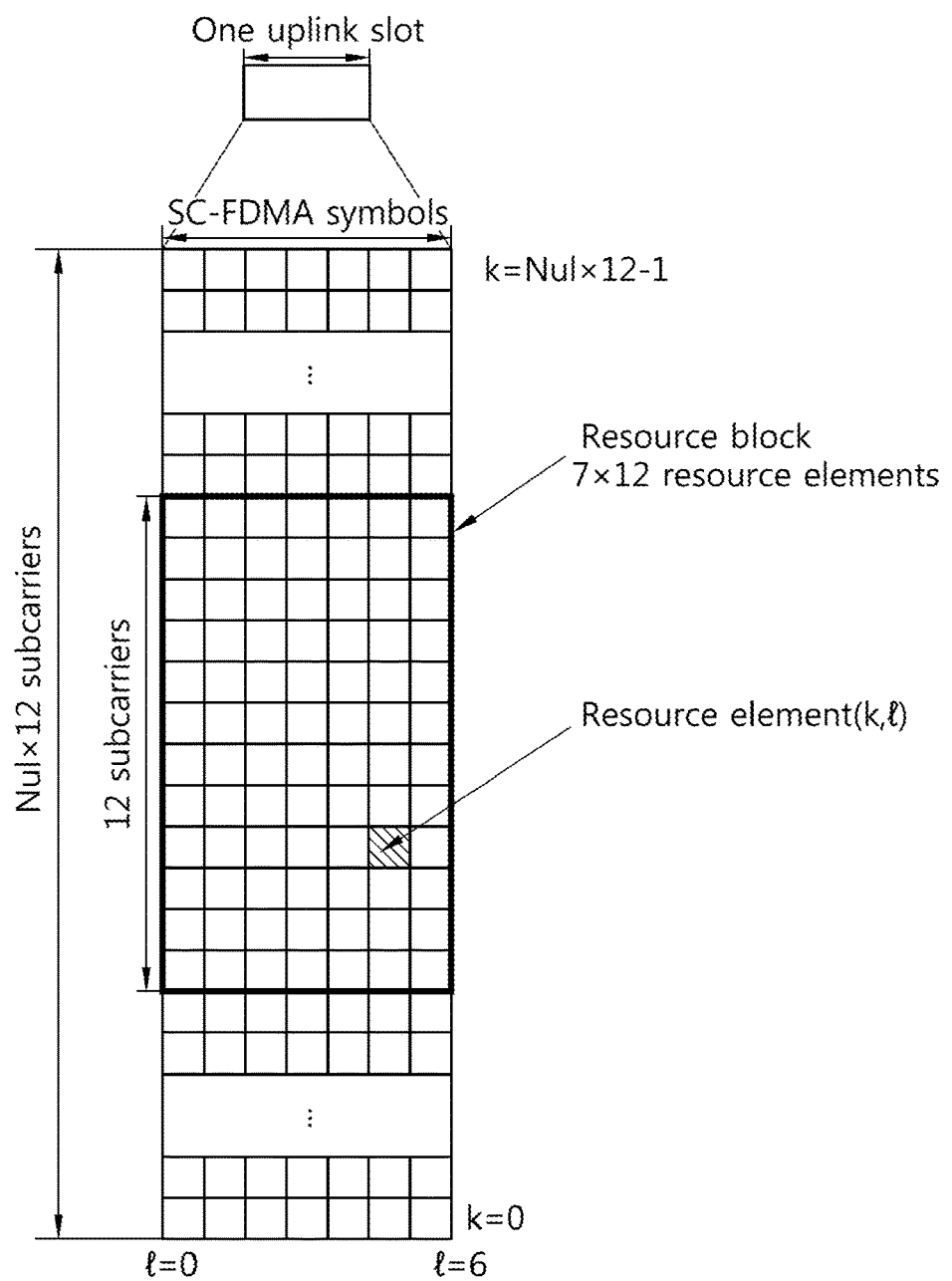
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
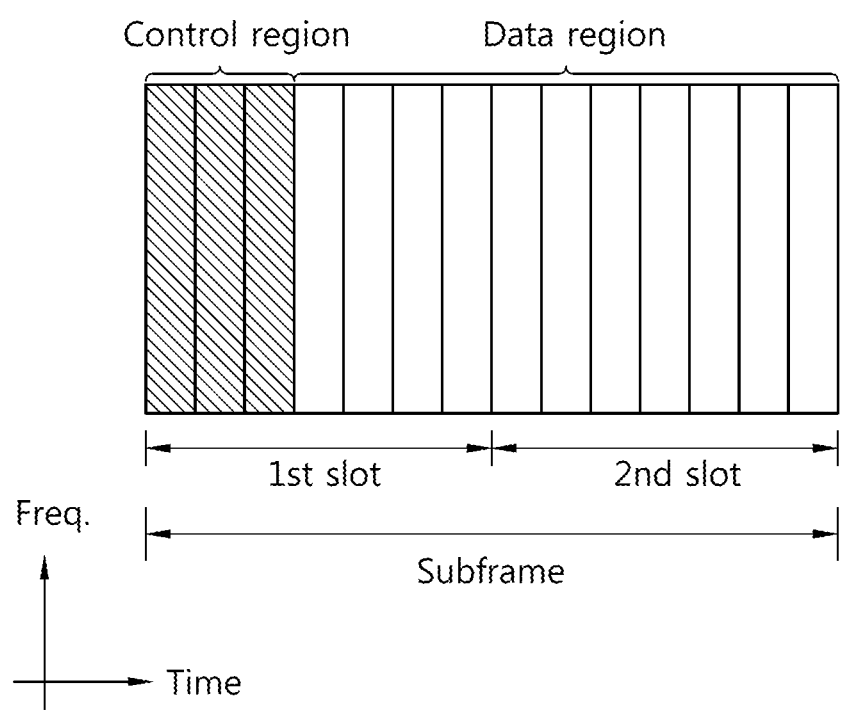
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Figure 4:
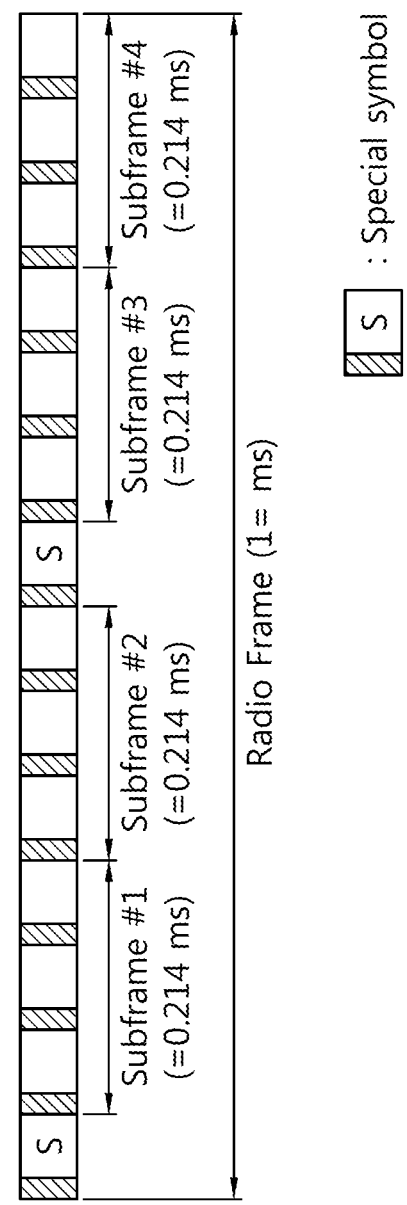
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
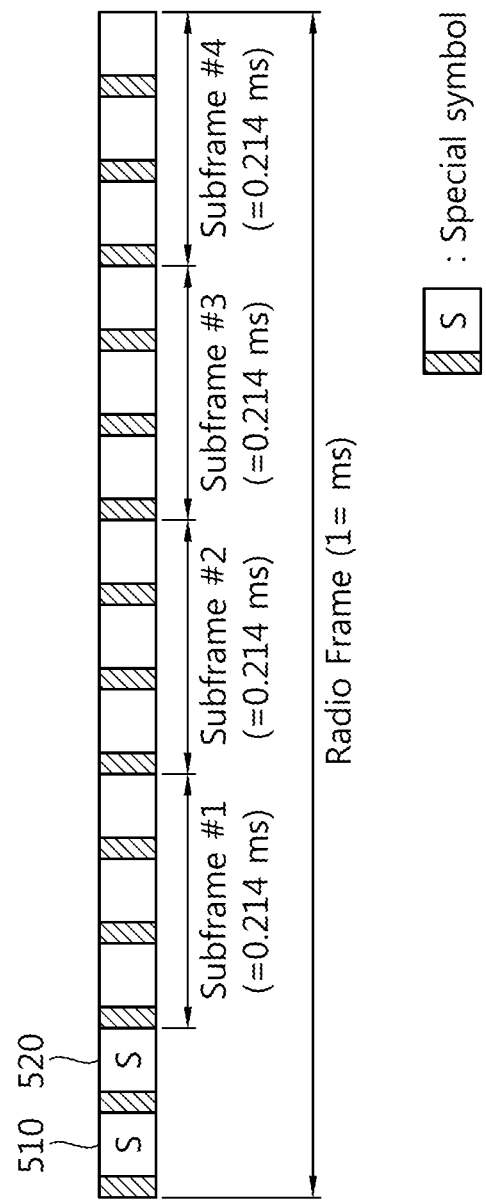
FIG. 5 shows an example of the structure of a radio frame in which special symbols have been contiguously disposed at the front part of the radio frame.
Figure 6:
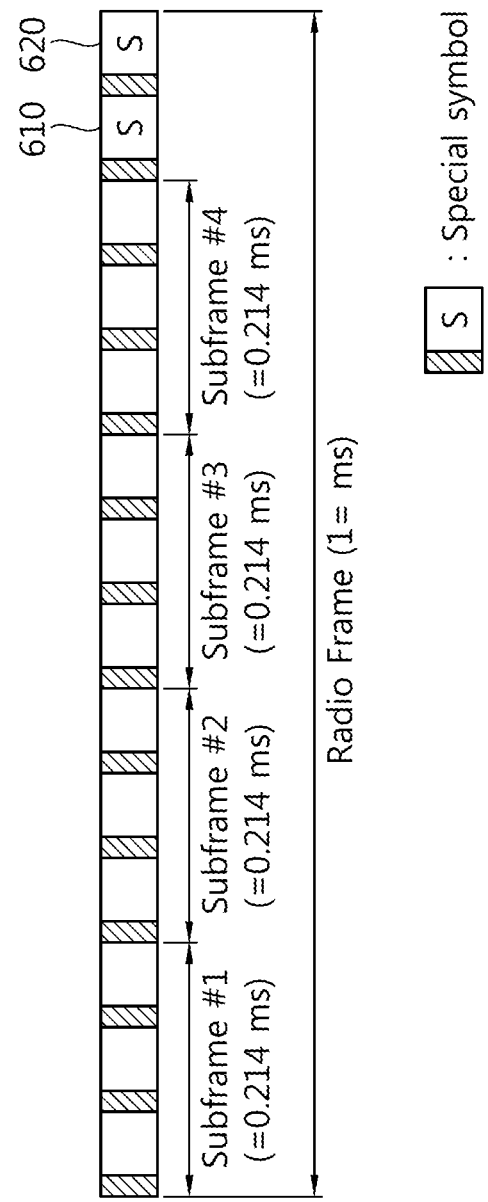
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH (s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

However, when the conventional TTI is divided into sTTIs, overheads of a control signal and a reference signal are generally increased. This is because there are resource regions for transmitting the control signal and reference signal for each sTTI, thereby reducing a resource region for data transmission. For example, when a length of the sTTI corresponds to three OFDM symbols, and the control signal is transmitted using one OFDM symbol, the resource for transmitting data is reduced to two OFDM symbols. Further, in the case of DCI (Downlink Control Information) format 1 in the PUCCH signal, DM-RSs (Demodulation Reference Signals) are continuously transmitted using three OFDM symbols, so that the control signal cannot be transmitted in the sTTI having three OFDM symbols. Therefore, when the sTTI is applied, it is necessary to reduce the overhead of the control signal via an effective configuration of the control signal and the reference signal.

Embodiments propose a method for reducing transmission resources for a short PDCCH (sPDCCH), which is a control channel in a sTTI, in a system to which In-band Dual TTI in which TTIs of different lengths are applied in the same frequency band is applied. In this connection, with referring to a sTTI structure having two OFDM symbols in the uplink/downlink, the proposed method will be described. The sTTI structure having two OFDM symbols has the advantage that the length of each sTTI may be fixed by arranging seven sTTIs in one subframe, as compared with the sTTI structure having three OFDM symbols. This makes it possible to use symbols that were not used in the uplink. However, the present embodiments are not limited only to the sTTI structure having two OFDM symbols. The present embodiments may be applied to various sTTI structures including sTTI structures having three or four OFDM symbols.

Hereinafter, the sTTI structure having two OFDM symbols will be described first, and, then, a method for reducing transmission resources of the control channel in the sTTI will be proposed.

<STTI Structure with Two OFDM Symbols>

Figure 7:
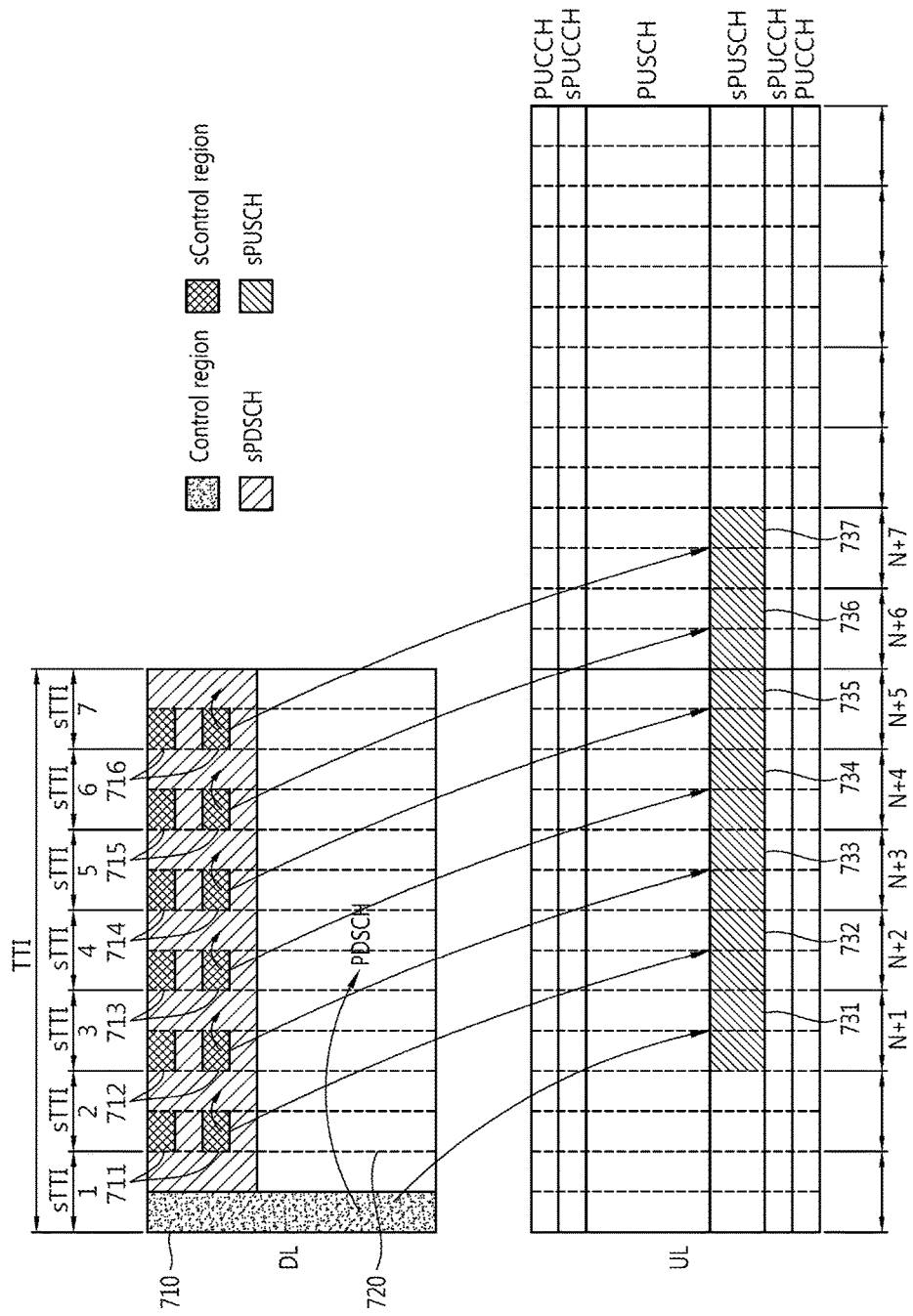
FIG. 7 shows an example of a sTTI structure when a length of a control region of a conventional TTI corresponds to one OFDM symbol.
Figure 8:
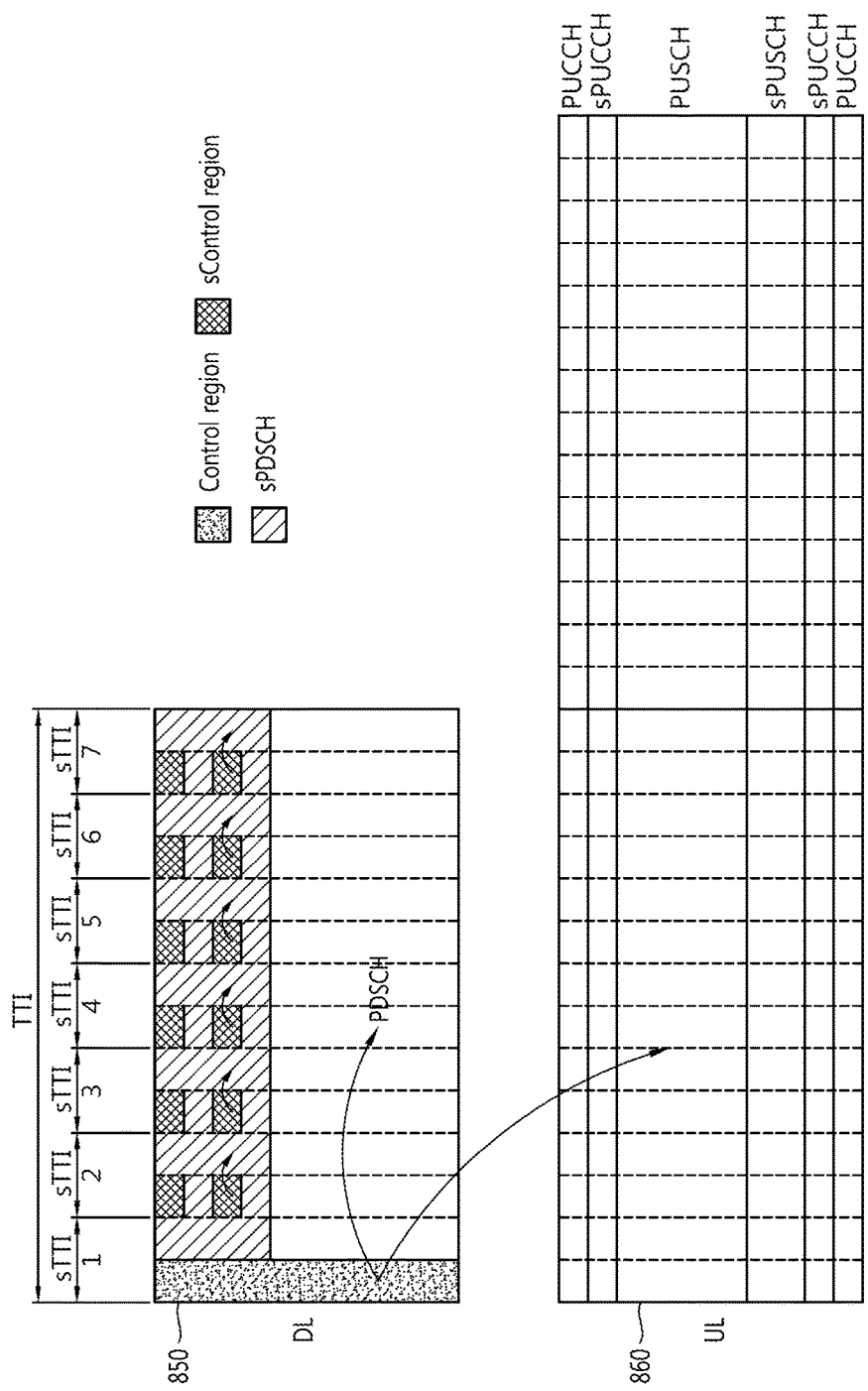
FIG. 8 shows an example of a sTTI structure when a length of a control region of a conventional TTI corresponds to one OFDM symbol.

FIG. 7 and FIG. 8 show respective examples of a sTTI structure when a length of a control region of a conventional TTI corresponds to one OFDM symbol.

In a specific subcarrier of a first OFDM symbol of each sTTI, a set of REs (Resource Elements) capable of transmitting control information of each sTTI is referred to as a sCR (short control region). The SCR may be called a control region of sTTI. In addition to sPDCCH, a short Physical Control Format Indicator Channel (sPPCHICH) or Short Physical Hybrid-ARQ Indicator Channel (sPHICH) may also be transmitted using the sCR. Hereinafter, a N value corresponds to a variable set differently depending on a processing speed of UE based on a corresponding sTTI.

FIG. 7 illustrates that a control region 710 of the conventional TTI indicates scheduling of a sPUSCH (short PUSCH, 731) in an uplink of the same subframe, scheduling of a short PDSCH (sPDSCH) in a first sTTI in a downlink of the same subframe, and scheduling of a PDSCH 720 in the conventional TTI in the downlink of the same subframe, respectively. In addition, FIG. 7 further illustrates that corresponding sCRs 711, 712, 713, 714, 715 and 716 in the corresponding sTTIs respectively indicate respectively schedulings of sPDSCHs in the corresponding sTTIs to respectively. FIG. 7 furthermore illustrates that corresponding sCRs 711, 712, 713, 714, 715, and 716 in the corresponding sTTIs indicate sequential schedulings of the corresponding sPUSCHs 732, 733, 734, 735, 736, and 737 in the uplink of the same subframe respectively. That is, the scheduling of the sPUSCH 731 of a (N+1)-th sTTI in the uplink is indicated by the control region 710 of the conventional TTI, and the scheduling of the sPUSCH 732 of a (N+2)-th sTTI in the uplink is indicated by the sCR 711. Based on the order as shown, the scheduling of the sPUSCH 733 of a (N+3)-th sTTI is indicated by the sCR 712, and, then, the scheduling of the sPUSCH 734 of a (N+4)-th sTTI is indicated by the sCR 713, and so on.

In the control region 710 of the conventional TTI, the sPUSCH 731, the sPDCCH for scheduling the sPDSCH, and the PDCCH of the conventional TTI for scheduling the PDSCH 720 are respectively transmitted.

FIG. 8 illustrates that a control region 850 of a conventional TTI indicates scheduling of a PUSCH 860 in an uplink of a fourth subframe after a downlink subframe. That is, a PDCCH for scheduling the PUSCH 860 is transmitted using the control region 850 of the conventional TTI.

That is, FIG. 7 and FIG. 8 may perform communications through the following procedure.

First, terminologies will be defined. A first downlink channel includes an sPDSCH that is received during the sTTI and an sPDCCH that schedules the sPDSCH. A second downlink channel corresponds to a conventional PDSCH received during the conventional TTI. A downlink control channel corresponds to a common PDCCH in the conventional TTI. Further, a first uplink common channel corresponds to a PUSCH of the conventional TTI, and a second uplink common channel corresponds to a sPTICH of the sTTI. Demodulating the channel corresponds to decoding the channel.

First, a plurality of first downlink channels included in the subframe corresponding to one conventional TTI and received during the sTTI are received, and a second downlink channel received during the conventional TTI is received. A plurality of the first downlink channels are received sequentially. That is, in the first sTTI, second sTTI, and third sTTI in this order, the first downlink channels are received.

Next, information on a resource block used for a plurality of the first downlink channels is obtained by using a resource-block indicator transmitted on the downlink control channel of a control region including a first symbol of a subframe. The resource-block indicator indicates the number of bits for resource allocation in the sPDCCH of the sTTI. In addition, the resource-block indicator is included in the DCI field included in the common PDCCH, whereby the resource-block indicator may be considered to be transmitted using the downlink control channel. The resource-block indicator will be described from FIG. 23.

Subsequently, a plurality of the first downlink channels are demodulated using information about the resource blocks used for the first downlink channel. This means that the terminal device may demodulate its sPDCCH using the resource-block indicator and, thus, demodulate the sPDSCH. The information on a resource block used for the plurality of the first downlink channels eventually corresponds to information on the M value in Table 3 of the present specification. Further, the second downlink channel is demodulated using the downlink control channel. This means that the common PDCCH of the conventional TTI is used to demodulate the PDSCH of the conventional TTI.

Furthermore, the control region of the conventional TTI contains scheduling information for the first uplink common channel in a fourth subframe after the same subframe. The control region in the sTTI contains scheduling information for the second uplink common channel in the same subframe. The first uplink common channel and the second uplink common channel are allocated to different frequency bands. The common PDCCH in the control region of the conventional TTI indicates the scheduling of the PUSCH in the uplink of the fourth subframe. The sPDCCH of the control region in the sTTI indicates the scheduling of the sPUSCH in the uplink of the same subframe.

Figure 9:
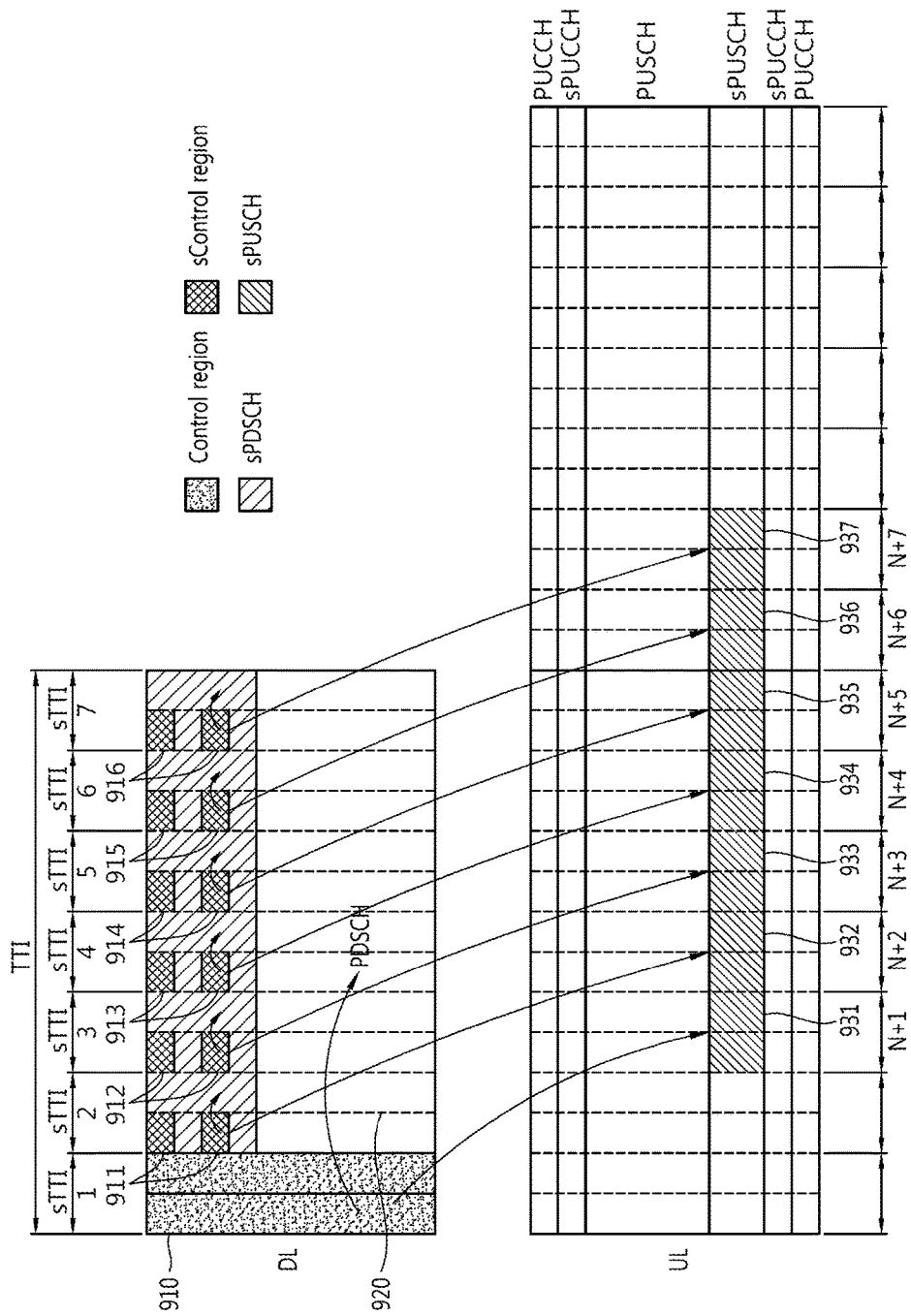
FIG. 9 shows an example of a sTTI structure when a length of a control region of a conventional TTI corresponds to two OFDM symbols.
Figure 10:
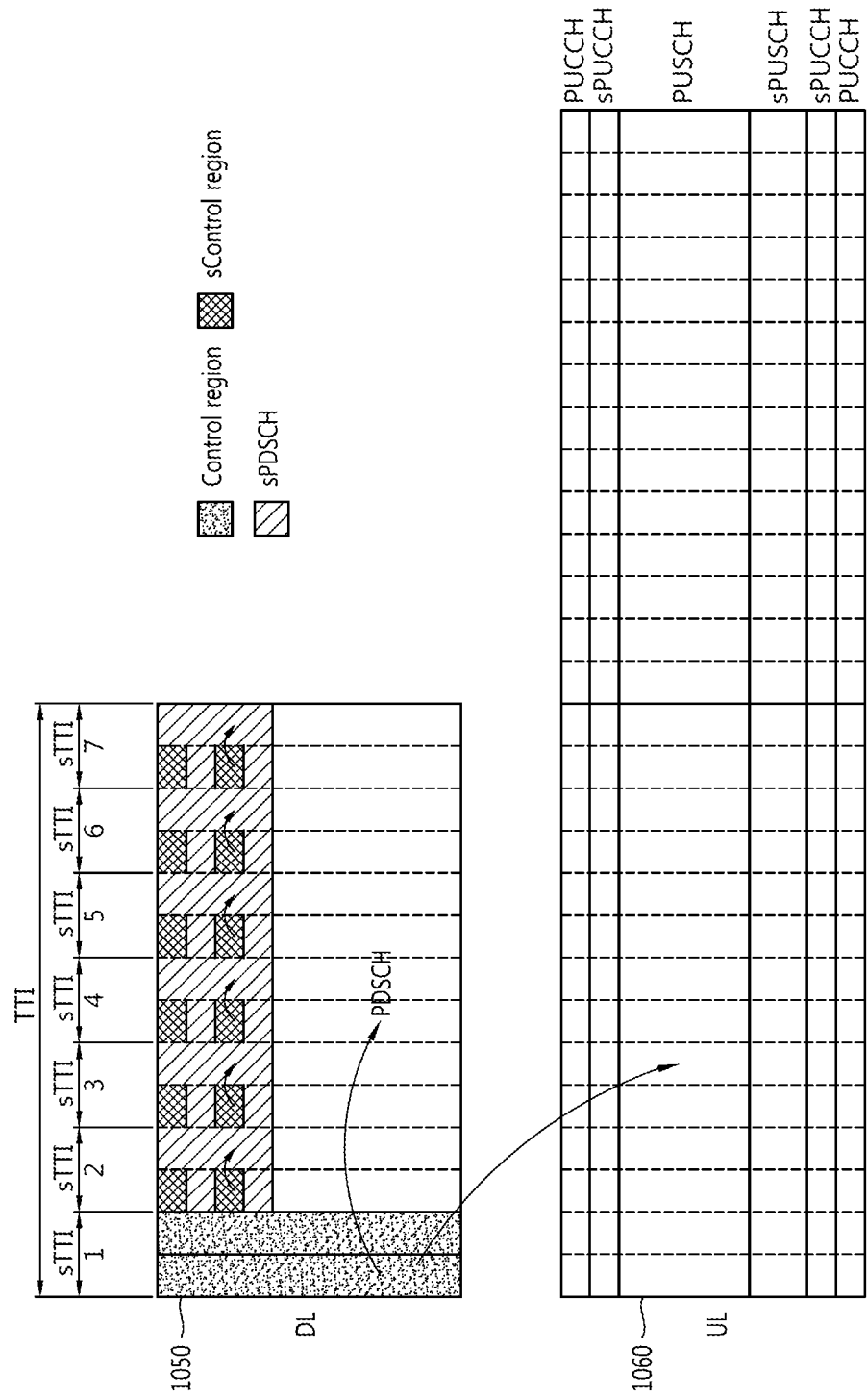
FIG. 10 shows an example of a sTTI structure when a length of a control region of a conventional TTI corresponds to two OFDM symbols.

FIG. 9 and FIG. 10 show examples of sTTI structures when a length of the control region of the conventional TTI corresponds to two OFDM symbols.

FIG. 9 illustrates that a control region 910 of the conventional TTI indicates scheduling of a sPUSCH (short PUSCH, 931) in an uplink of the same subframe, and scheduling of a PDSCH 920 in the conventional TTI in the downlink of the same subframe, respectively. In addition, FIG. 9 further illustrates that corresponding sCRs 911, 912, 913, 914, 915 and 916 in the corresponding sTTIs indicate respectively schedulings of sPDSCHs in the corresponding sTTIs respectively. FIG. 9 furthermore illustrates that corresponding sCRs 911, 912, 913, 914, 915, and 916 in the corresponding sTTIs indicate sequential schedulings of the corresponding sPUSCHs 932, 933, 934, 935, 936, and 937 in a N-th uplink subframe after the downlink subframe, respectively. That is, the scheduling of the sPUSCH 931 of a (N+1)-th sTTI in the uplink is indicated by the control region 910 of the conventional TTI, and the scheduling of the sPUSCH 932 of a (N+2)-th sTTI in the uplink is indicated by the sCR 911. Based on the order as shown, the scheduling of the sPUSCH 933 of a (N+3)-th sTTI is indicated by the sCR 912, and, then, the scheduling of the sPUSCH 934 of a (N+4)-th sTTI is indicated by the sCR 913, and so on.

In the control region 910 of the conventional TTI, the sPDCCH for scheduling the sPUSCH 931, and the PDCCH of the conventional TTI for scheduling the PDSCH 920 are respectively transmitted. However, unlike FIG. 7, since there is no data region in the first sTTI in the downlink subframe, and therefore, no sPDSCH exists, downlink data cannot be transmitted in the first sTTI.

FIG. 10 illustrates that a control region 1050 of the conventional TTI indicates scheduling of a PUSCH 1060 in the uplink of the fourth subframe after the downlink subframe. That is, the PDCCH for scheduling the PUSCH 1060 is transmitted using the control region 1050 of the conventional TTI.

FIG. 9 and FIG. 10 may perform communications via the same procedure as shown in FIG. 7 and FIG. 8, except that there is no sPDSCH in the first sTTI in FIG. 9 and FIG. 10.

Figure 11:
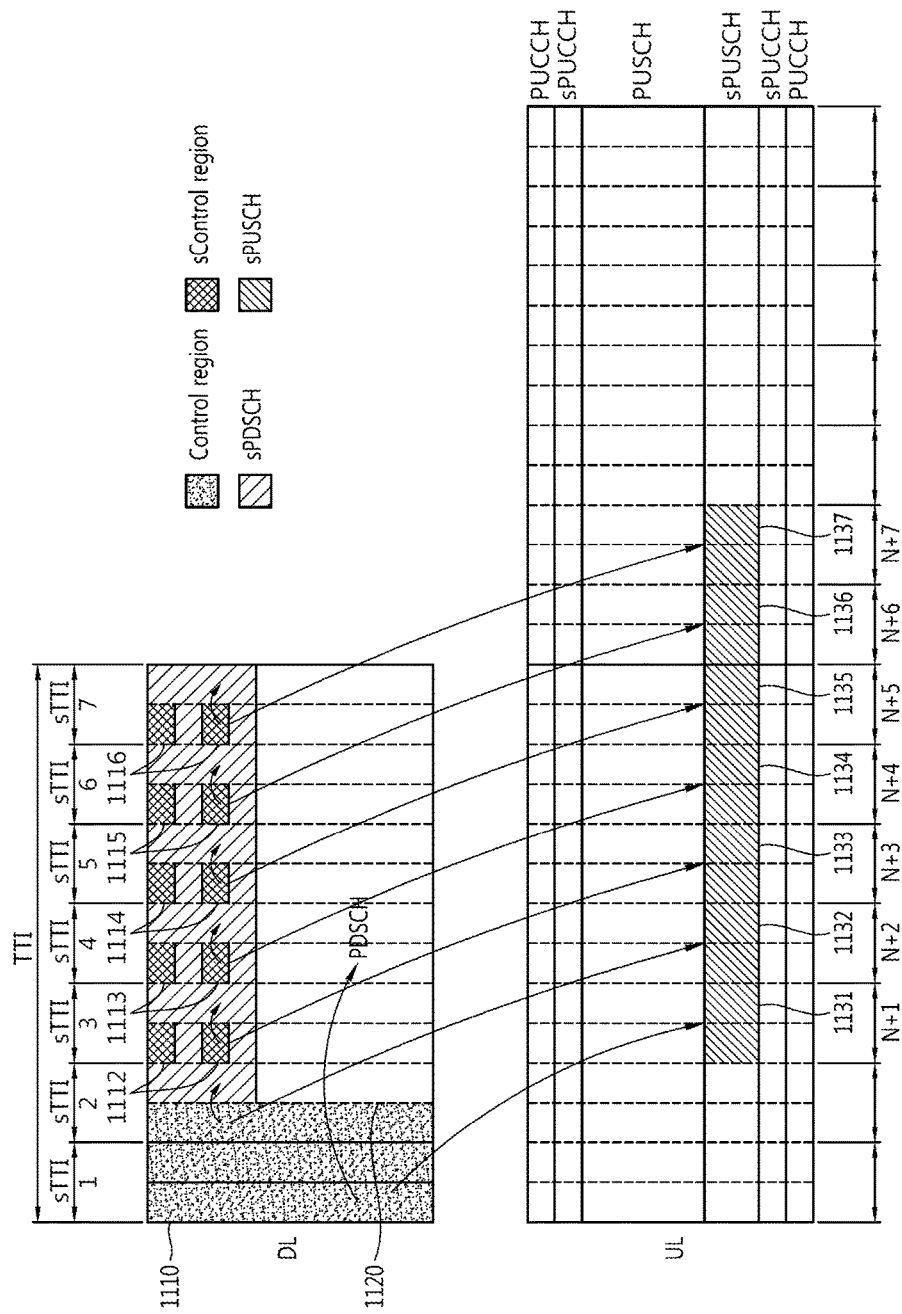
FIG. 11 shows an example of a sTTI structure when a length of a control region of a conventional TTI corresponds to three OFDM symbols.
Figure 12:
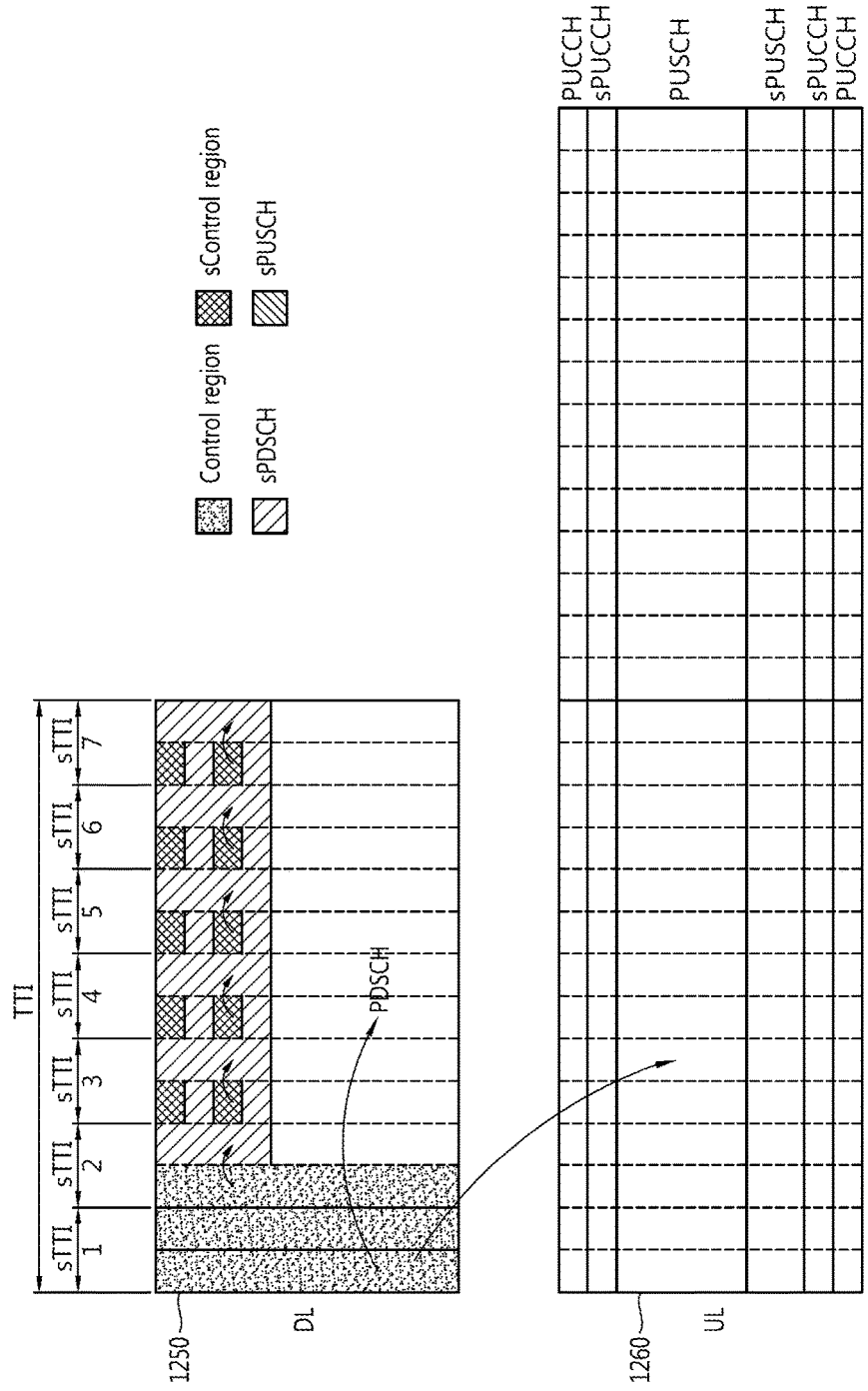
FIG. 12 shows an example of a sTTI structure when a length of a control region of a conventional TTI corresponds to three OFDM symbols.

FIG. 11 and FIG. 12 show examples of sTTI structures when a length of the control region of the conventional TTI corresponds to three OFDM symbols.

FIG. 11 illustrates that a control region 1110 of the conventional TTI indicates scheduling of a sPUSCH (short PUSCH, 1131) in an uplink of the same subframe, and scheduling of a PDSCH 1120 in the conventional TTI in the downlink of the same subframe, respectively. In addition, FIG. 11 further illustrates that corresponding sCRs 1111, 1112, 1113, 1114, 1115 and 1116 in the corresponding sTTIs indicate respectively schedulings of sPDSCHs in the corresponding sTTIs respectively. FIG. 11 furthermore illustrates that corresponding sCRs 1111, 1112, 1113, 1114, 1115, and 1116 in the corresponding sTTIs indicate respectively sequential schedulings of corresponding sPUSCHs 1132, 1133, 1134, 1135, 1136, and 1137 in a N-th uplink subframe after the downlink subframe, respectively. That is, the scheduling of the sPUSCH 1131 of a (N+1)-th sTTI in the uplink is indicated by the control region 1110 of the conventional TTI, and the scheduling of the sPUSCH 1132 of a (N+2)-th sTTI in the uplink is indicated by is also indicated by the control region 1110 of the conventional TTI. This is because a sCR is not allocated to the second sTTI in the downlink. Based on the order as shown, the scheduling of the sPUSCH 1133 of a (N+3)-th sTTI is indicated by the sCR 1112, and, then, the scheduling of the sPUSCH 1134 of a (N+4)-th sTTI is indicated by the sCR 1113, and so on.

In the control region 1110 of the conventional TTI, sPUSCH 1131, the sPDCCH for scheduling the sPDSCH, and the PDCCH of the conventional TTI for scheduling the PDSCH 1120 are respectively transmitted. However, unlike FIG. 7 and FIG. 8, since there is no data region in the first sTTI in the downlink subframe, downlink data cannot be transmitted in the first sTTI. Further, unlike FIG. 7 to FIG. 10, the sPDCCH for scheduling the sPDSCH of the second sTTI is transmitted using the control region 1110 of the conventional TTI. As described above, the sPDCCH for scheduling the sPUSCH 1132 in the uplink subframe is transmitted using the control region 1110 of the conventional TTI.

FIG. 12 illustrates that the control region 1250 of the conventional TTI indicates scheduling of a PUSCH 1260 in the uplink of the fourth subframe after the downlink subframe. That is, the PDCCH for scheduling the PUSCH 1260 is transmitted using the control region 1250 of the conventional TTI.

FIG. 11 and FIG. 12 may perform communications via the same procedure as the procedure of FIG. 7 and FIG. 8, except that, in the procedure of FIG. 11 and FIG. 12, the second downlink common channel is not present, and the scheduling of the sPDSCH of the second sTTI and scheduling of the sPUSCH of the (N+2)-th sTTI in the uplink are indicated by the control region of the conventional TTI.

Figure 13:
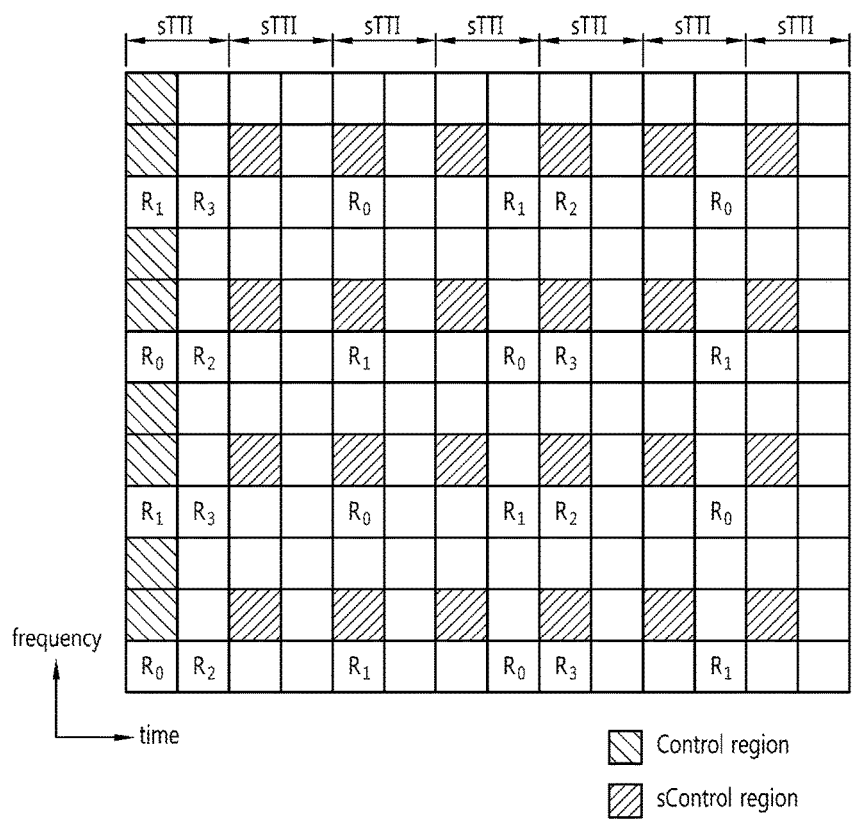
FIG. 13 shows an example of a sCR arrangement using four REs in each sTTI.
Figure 14:
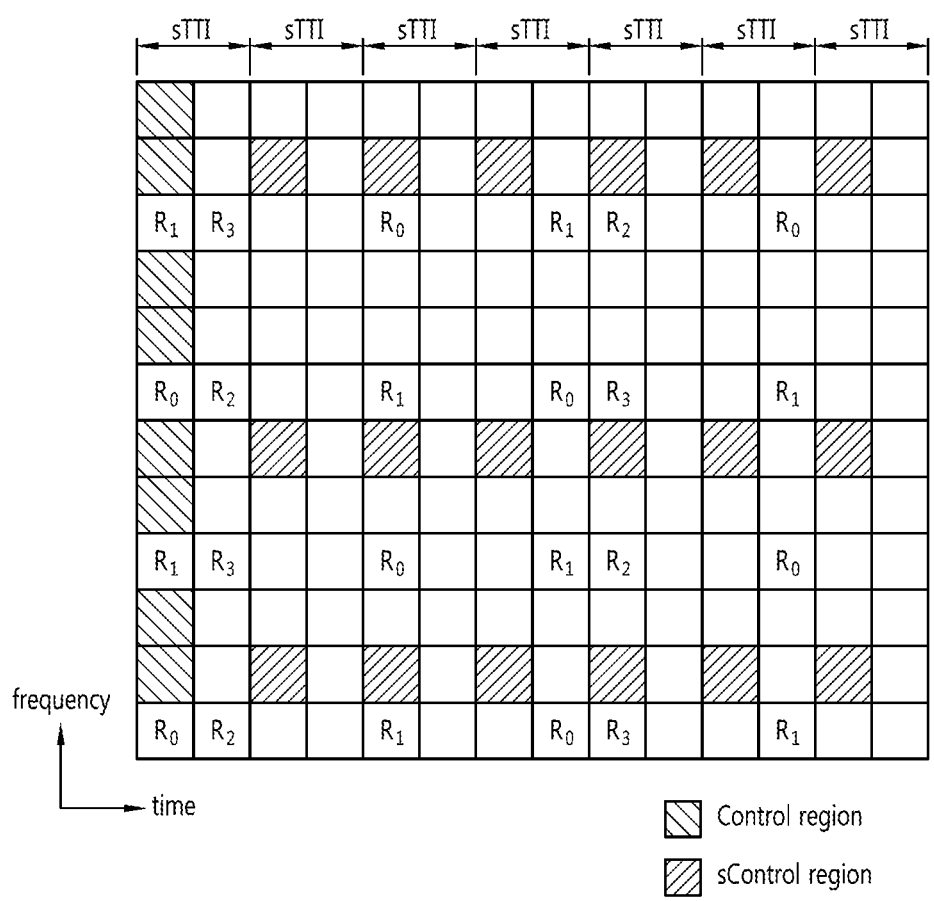
FIG. 14 shows an example of a sCR arrangement using three REs in each sTTI.
Figure 15:
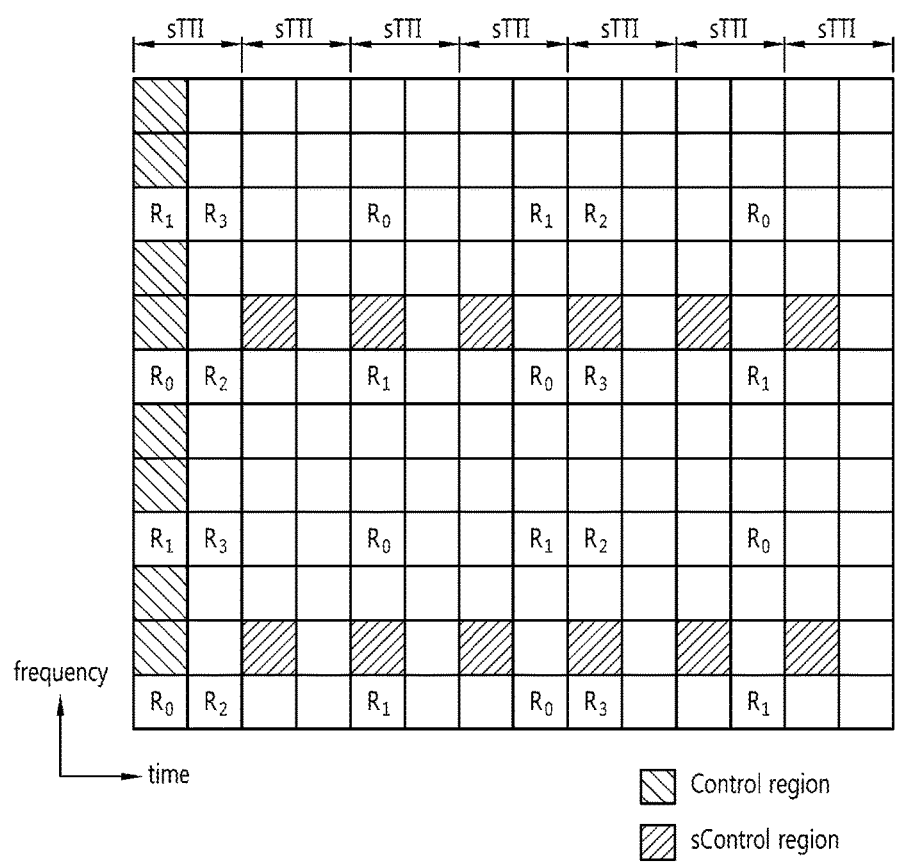
FIG. 15 shows an example of a sCR arrangement using two REs in each sTTI.
Figure 16:
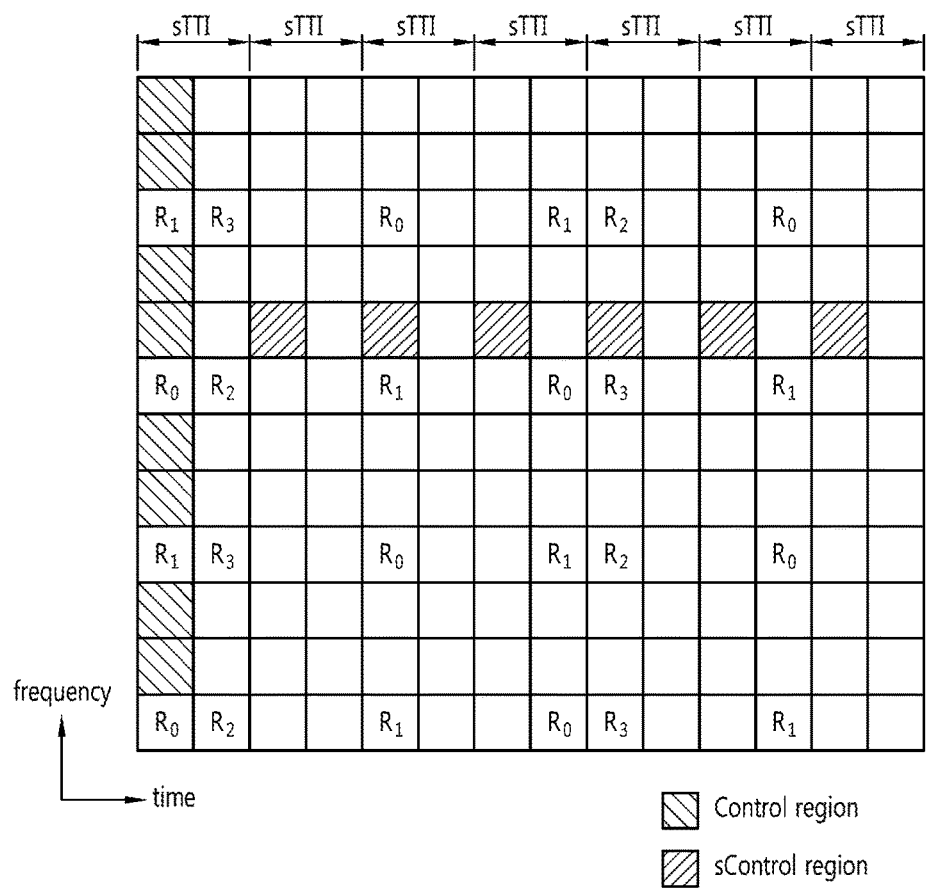
FIG. 16 shows an example of sCR arrangement using one RE in each sTTI.

FIG. 13 shows an example of a sCR arrangement using four REs in each sTTI. FIG. 14 shows an example of a sCR arrangement using three REs in each sTTI. FIG. 15 shows an example of a sCR arrangement using two REs in each sTTI. FIG. 16 shows an example of sCR arrangement using one RE in each sTTI. In all of FIG. 13 to FIG. 16, the control region of the conventional TTI is arranged in a first sTTI.

The arrangements as configured in FIG. 13 to FIG. of 16 are based on the following rules. As a first rule, in order to reduce the complexity of the system, a RE for a sCR is not arranged in the subcarrier over which the cell-specific reference signal (hereinafter, CRS) is transmitted. That is, the frequency band of the sCR and the frequency band of the CRS are allocated into different regions. As a second rule, in order to obtain frequency diversity, REs for sCR are arranged at regular spacings. This is because the larger the frequency spacing, the lower the fading correlation. In all of FIG. 13 to FIG. 16, CRSs are assigned to 3, 6, 9, and 12-th regions along the frequency axis. Thus, the sCR are arranged to prevent the system complication due to overlapping resources into the corresponding RE region. For example, in FIG. 13, the control region of the conventional TTI is arranged in an RE region to which the CRS of a first OFDM symbol of the first sTTI is not allocated. In each first OFDM symbol of each of the second to seventh sTTIs, the sCR are arranged into second, fifth, eighth, and eleventh RE regions along the frequency axis to which the CRSs are not allocated.

Furthermore, the arrangement of sCR may be adjusted via the sPCFICH value. For example, when sPCFICH is composed of 2 bits, bit '11' may be applied to FIG. 13, bit '10' may be applied to FIG. 14, bit '01' may be applied to FIG. 15, bit '00' may be applied to FIG. 16. The sPCFICH may be transmitted commonly in all sTTIs via the common PDCCH included in the control region of the conventional TTI, or may be included in each sCR of each sTTI and be transmitted in each sTTI.

A unit for scheduling sTTI may be embodied as sRB (short RB). SRB may be designed to have more subcarriers than RB, which is a unit for scheduling TTI. Hereinafter, an example of downlink or uplink in which sRB is composed of 24 subcarriers or 36 subcarriers in two OFDM symbols will be illustrated. However, the number of subcarriers in the sRB is not limited thereto and may have 48 or more subcarriers.

In this connection, the reason why the number of subcarriers constituting the sRB is increased is as follows.

1. When applying sTTI, it is more effective to reduce the overhead of the resource allocation control signal by increasing the number of subcarriers in the sRB. When the number of subcarriers in the sRB is maintained at 12, and if the length of the sTTI decreases, the region of the sPDSCH also at least decreases proportionally. When the region of the sPDSCH becomes too small, a single terminal device is rarely allocated only a single sRB when receiving a signal. Therefore, it is efficient to increase the number of subcarriers in the sRB.

2. This is because it is necessary to reduce the overhead of the reference signal when transmitting MIMO (Multi-Input Multi-Output). The sTTI has an increased overhead of DM-RS for MIMO transmission due to the reduction of the region of sPDSCH. Since the DM-RS must be arranged per each RB, the overhead of the DM-RS may be reduced by increasing the number of subcarriers in the sRB.

3. This is because an original sequence length of the reference signal must be secured. The reference signal minimizes performance degradation due to interference between terminal devices by arranging mutually orthogonal sequences between the terminal devices. In general, the longer the length of the sequence, the better the performance of the sequence. Thus, in order to keep the performance of the sequence to be equal to that of the conventional TTI, the number of subcarriers in the sRB must increase. This characteristic is more evident in the uplink PUCCH transmission. For example, in the case of transmitting PUCCH using PUCCH format 1, it is possible to obtain sufficient sequence performance by arranging sequences continuously over three OFDM symbols. Therefore, in order to maintain the length of the sequence while applying the sTTI having three OFDM symbols or less, the number of subcarriers in the sRB must be increased.

Hereinafter, an example of an arrangement of the DM-RS when the subcarrier of sRB is increased will be described. The DM-RS is also referred to as a terminal device-specific (UE-specific) reference signal. This is called the terminal device-specific (UE-specific) reference signal because each of these demodulation reference signals is intended to be used only for channel estimation of one specific terminal device or UE. Therefore, the DM-RS is used to decode sPDSCH, sPUCCH, or sPUSCH only within a resource block allocated for sPDSCH, sPUCCH (short PUCCH), or sPUSCH transmitted to the specific terminal device. To illustrate the advantage of the use of the sRB, the present applicants first describe the arrangement of the CRS and DM-RS of the conventional LTE system.

Figure 17:
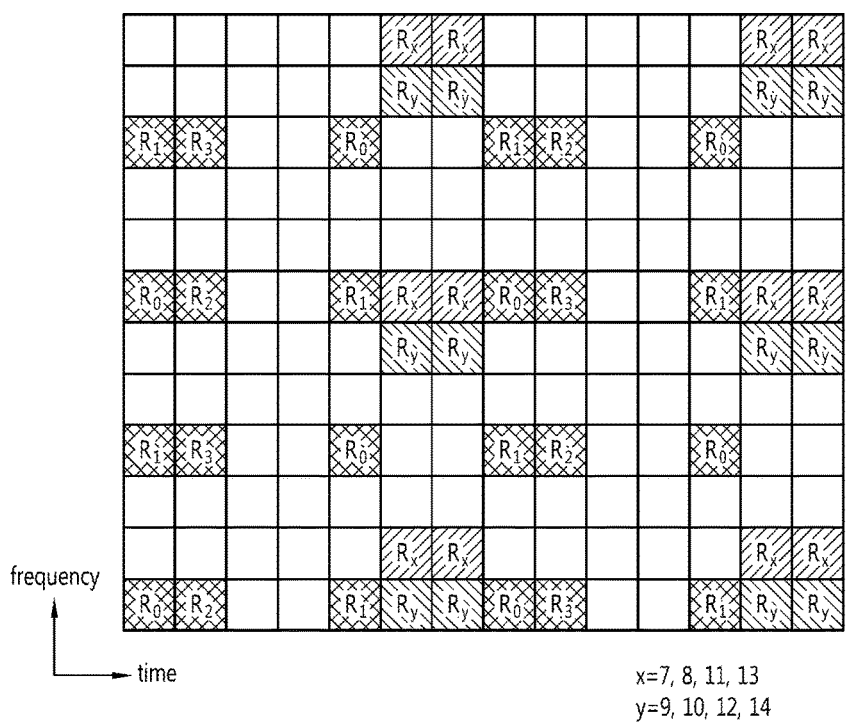
FIG. 17 shows an arrangement of CRSs and DM-RSs as for a conventional LTE system.

FIG. 17 shows an arrangement of CRSs and DM-RSs as for a conventional LTE system.

In the conventional LTE system, DM-RSs (Rx, Ry) are arranged in sixth, seventh, 13-th, and 14-th symbols along the time axis of the subframe. Along the frequency axis of the subframe, DM-RSs (Rx, Ry) are arranged in first, second, sixth, seventh, 11-th, and 12-th subcarriers from the top. Rx corresponds to antenna ports 7, 8, 11, and 13, and Ry corresponds to antenna ports 9, 10, 12, and 14.

Figure 18:
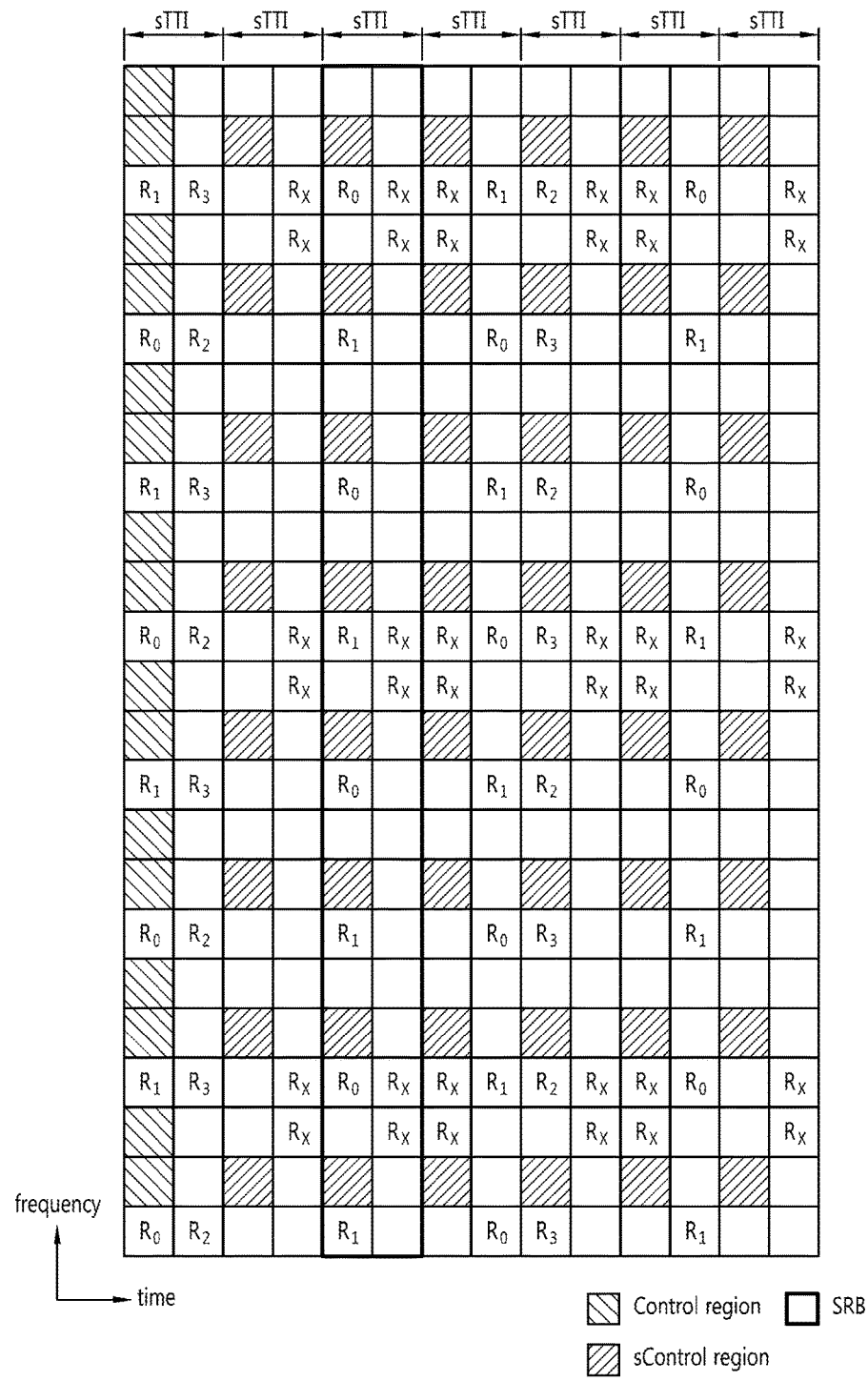
FIG. 18 shows an example of an arrangement of DM-RSs into a sRB (short RB) of sTTI of a downlink.
Figure 19:
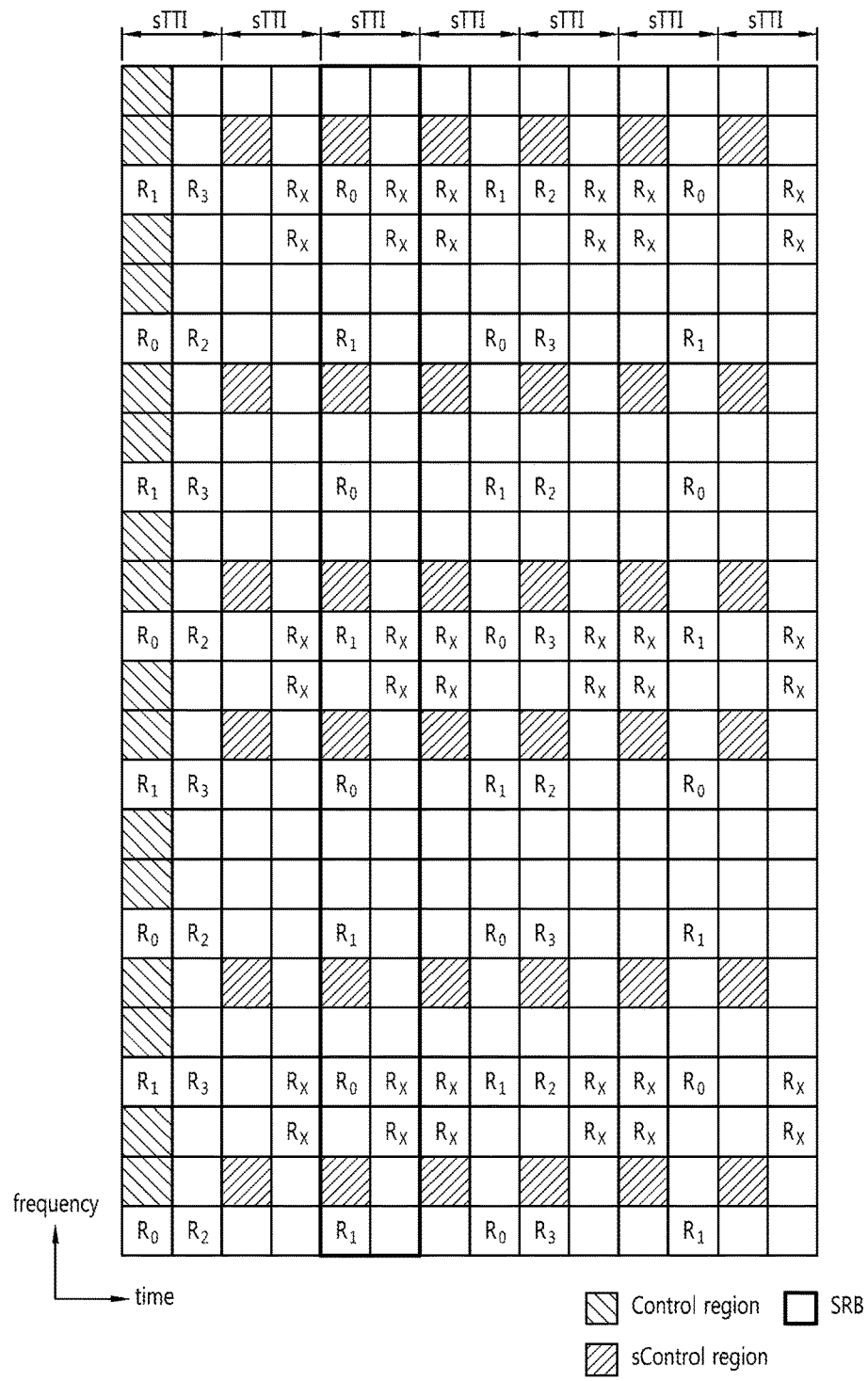
FIG. 19 shows an example of arrangement of DM-RSs into a sRB (short RB) of sTTI of a downlink.

FIG. 18 shows an example of an arrangement of DM-RSs into a sRB (short RB) of sTTI of a downlink. FIG. 19 shows an example of arrangement of DM-RSs into a sRB (short RB) of sTTI of a downlink.

FIG. 18 and FIG. 19 show respective arrangements of sCR and DM-RS for each sTTI in the sRB with 24 subcarriers of the downlink. When, for extension to 24 subcarriers, the CRS and DM-RS arrangement of the conventional LTE system shown in FIG. 11 is repeated twice upwards and downwards along the frequency axis, Rx and Ry may be repeated four times along the frequency axis on the boundary line. That is, there are Rx and Ry with 11th and 12th subcarriers from a top along the frequency axis, and there are Rx and Ry with 13th and 14th subcarriers from a top along the frequency axis. This is a waste of resources due to the fact that too much reference signals are concentrated on the frequency axis. Therefore, the reference signals may be utilized more efficiently by arranging the DM-RSs into 3-th, 4-th, 12-th, 13-th, 21-th and 22-th subcarriers from the top along the frequency axis, as shown in FIG. 12.

In FIG. 18, for each sTTI, 8 subcarriers are assigned sCRs respectively. In FIG. 19, for each sTTI, six subcarriers are assigned sCRs respectively.

Figure 20:
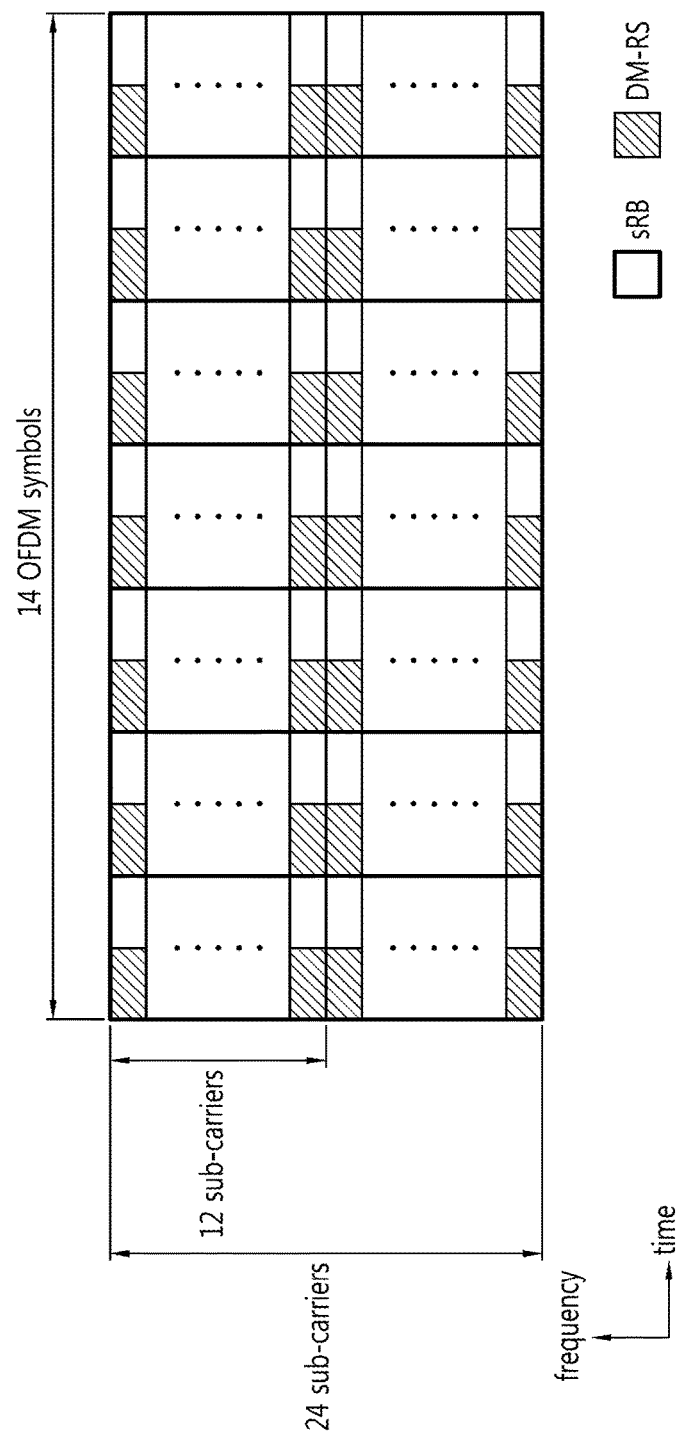
FIG. 20 shows an example of arrangement of DM-RSs into a sRB capable of transmitting sPUCCH and sPUSCH of sTTI of an uplink.

FIG. 20 shows an example of arrangement of DM-RSs into a sRB capable of transmitting sPUCCH and sPUSCH of sTTI of an uplink.

FIG. 20 illustrates a type of sTTI and sRB that can transmit both sPUCCH and sPUSCH in the uplink. The DM-RSs are arranged in 1-th, 3-th, 5-th, 7-th, 9-th, 11-th, 13-th OFDM symbols among 14 OFDM symbols.

Referring to FIG. 20, in order to increase the sequence length of the reference signal, the number of subcarriers of sRB is extended to 24, while the DM-RS is arranged into the first symbol of each sRB to minimize the delay caused by the decoding of the reference signal. Again, similarly, the number of subcarriers in the sRB is not limited to 24, but may be extended to 36, 48, or the like.

Figure 21:
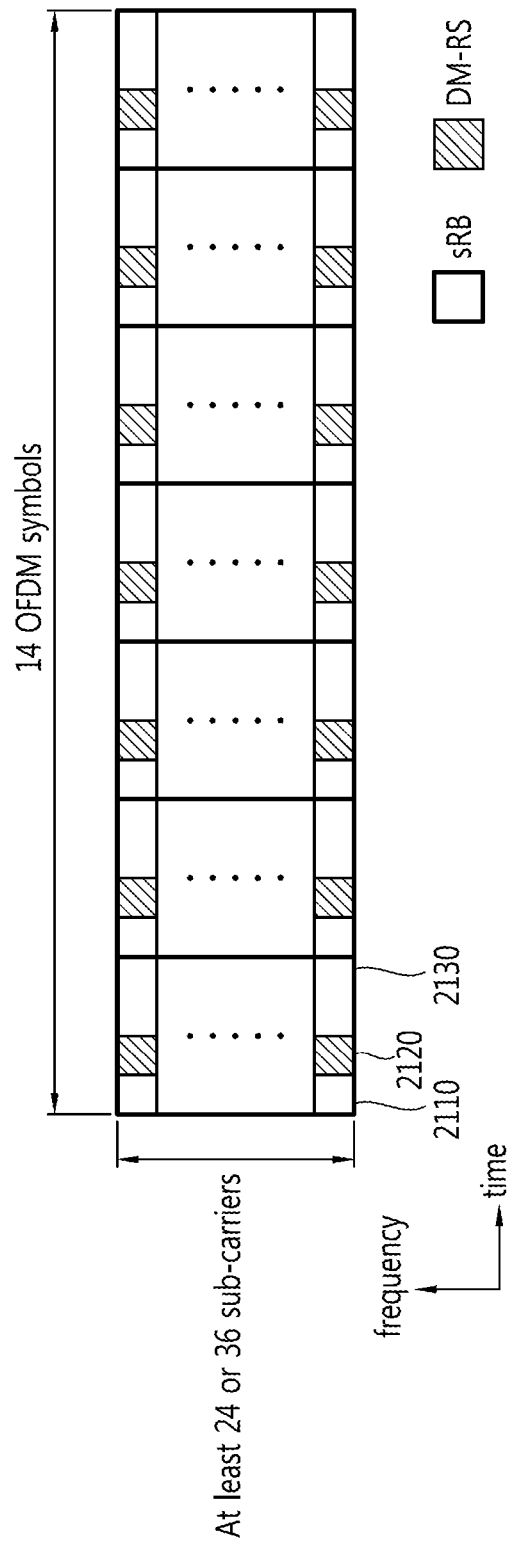
FIG. 21 shows an example of arrangement of DM-RSs into a sRB capable of transmitting sPUSCH of sTTI of an uplink.
Figure 22:
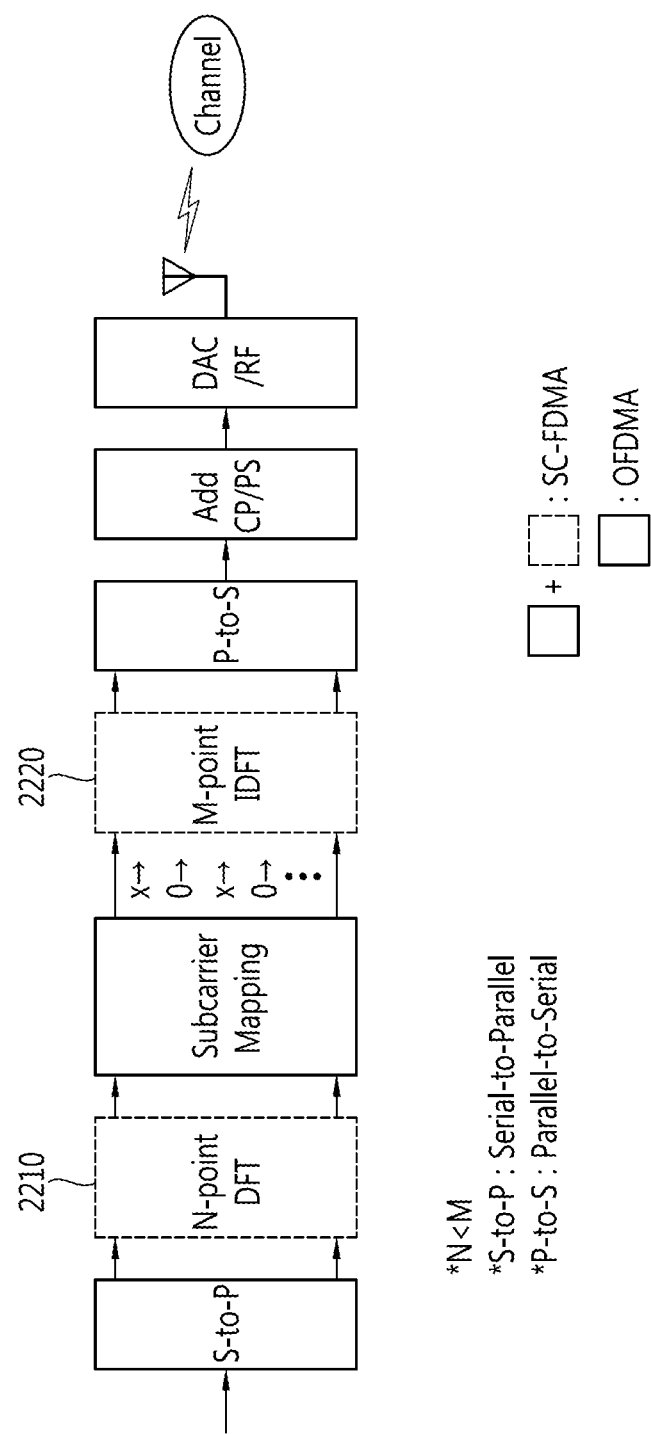
FIG. 22 shows a structure of a transmission stage for generating a DFTS-OFDM signal to arrange DM-RSs in FIG. 21.

FIG. 21 shows an example of arrangement of DM-RSs into a sRB capable of transmitting sPUSCH of sTTI of an uplink. FIG. 22 shows a structure of a transmission stage for generating a DFTS-OFDM signal to arrange DM-RSs in FIG. 21.

Referring to FIG. 21, the first OFDM symbol of each sRB is bisected, and, then, a first half symbol 2110 is allocated to transmit data, and a second half symbol 2120 is arranged DM-RS. To produce an OFDM symbol with a half of the length of the conventional OFDM symbol, a procedure in a transmission stage as shown in FIG. 22 is performed. When a N-point DFT block 2210 inputs a DFT-spread OFDM signal to the M-point IDFT block 2220 in the transmission stage in FIG. 22, 0 is allocated to an even-numbered symbol, while a DFTS OFDM signal (data, herein referred to as "x") is assigned to an odd-numbered symbol. As a result, the OFDM symbols are repeated over time. That is, the former half and the latter half have the same structure, and only one of these two halves is allocated DM-RS. In this connection, the DM-RS is allocated only to the back half 2120, and the former half 2110 is allocated to transmit data. Via this process, an example of arranging the DM-RS in the sRB capable of transmitting the sPUSCH as shown in FIG. 21 may be generated. In this case, since there are three OFDM symbols 2110, 2120, and 2130 in total in the sTTI, a total of three CPs (cyclic prefix) are required for each sTTI. In this connection, the CP length of the three OFDM symbols 2110, 2120, 2130 is ⅔ of the conventional CP length to match the length of the sTTI with the conventional TTI length. In this connection, likewise, the number of subcarriers in the sRB is not limited to 24, but may be extended to 36, 48, or the like.

<Method for Reducing Transmission Resources for Control Channel in sTTI>

Methods for reducing transmission resources for sPDCCH in the sTTI are proposed in a system to which In-Band Dual TTI is applied, with reference to the sTTI structure having the two OFDM symbols described above. There are four methods for reducing transmission resources for sPDCCH. First, there is a method of reducing the transmission resources for the sPDCCH in the sTTI using the common PDCCH located in the control region of the conventional TTI. Second, there is provided a method of reducing the transmission resources for the sPDCCH by periodically changing the transmission format of the sPDCCH. Third, there is a method of reducing the transmission resources for the sPDCCH by changing transmission resources based on the format of the sTTI control information. Fourth, there is provided a method of reducing the transmission resources for the sPDCCH by reducing the size of retransmission signal in the sTTI.

1. Using a Common PDCCH Located in the Control Region of the Conventional TTI

This embodiment proposes a method of reducing the amount of information of the sPDCCH in the sTTI by using the common PDCCH in the TTI including the sTTIs. This is different from the method of dynamically allocating the downlink/uplink sTTI frequency bands using the common PDCCH. In this embodiment, the method relates to a dynamic change of the number of bits for resource allocation in the sPDCCH so as to reduce the amount of information in the sPDCCH.

In general, the information occupying the most bits in the control signal (common PDCCH) is information used for resource allocation. The reason why the large number of bits are required for resource allocation is that if multiple users desire to transmit or receive signals within a single TTI, the frequency resources must be distributed to multiple terminal devices within the conventional TTI. Since the scheduling time unit of sTTI is shorter than that of the conventional TTI, the number of terminal devices to transmit or receive signals simultaneously in a single sTTI tends to decrease. For example, if frequency resources are allocated to seven terminal devices in the conventional TTI, it is possible to transmit or receive signals to seven terminal devices during the same time duration as the conventional TTI, by scheduling one terminal device for every sTTI in a sTTI structure having two OFDM symbols. Therefore, it may be expected that the number of bits used for resource allocation in the sTTI will be reduced compared to the number of bits used for resource allocation in the conventional TTI.

Reducing the number of bits in the sTTI has the advantage of reducing the resources required for the sPDCCH transmission, but has a disadvantage in that transmission is delayed when traffic of the terminal devices are concentrated in the sTTI. For example, if only two bits are used for sTTI resource allocation, resources may be allocated to only four terminal devices (00, 01, 10, and 11). However, when five or more terminal devices intend to concurrently transmit or receive signals, the signal should be necessarily transmitted in a next sTTI. Typically, since terminal devices transmitting or receiving signals within the sTTI are terminal devices with high sensitivity to delay, this situation may lead to a failure of the service provided to the terminal devices. Therefore, in the following, there is provided a method of dynamically changing, on a subframe basis, the number of resource allocation bits in the sPDCCH used by the corresponding sTTI using the common PDCCH in the conventional TTI including the sTTI. The proposed method is equally applicable both to downlink and uplink.

The operation procedure of the method proposed in this embodiment is as follows.

First, terminal devices receive in advance a table that may map the resource allocation bits number as included in RRC (Radio Resource Control). The table may be changed by the number of RBs (subband region) to which sTTI is applied, DCI format of sPDCCH, resource mapping method in sTTI, and the like. Details of the concrete table will be described in detail below.

Second, an indicator indicating the number of resource allocation bits in the sPDCCH is transmitted as included in the PDCCH.

Third, the terminal devices apply the indicator to the mapping table to find the number of bits to be applied to the actual sPDCCH. As a result, the main goal is to reduce the number of bits to be applied to the actual sPDCCH.

Fourth, the terminal devices decode the sPDCCH using the number of bits actually applied to the sPDCCH.

Specific examples of the method proposed in the present embodiment are as follows.

The following tables are examples of tables transmitted to the terminal device as included in RRC. In this connection, L refers to the number of bits of information indicating the number of bits for resource allocation in the sPDCCH in the common PDCCH. $N_1$ refers to the number of sRBs assigned to the sTTI, and $N_2$ refers to the number of sRBs included in the group of sRBs in the sTTI. $N_1$ does not imply information indicating whether the sRB has 12 subcarriers or 24 subcarriers, and such information is known in advance to the base station and the terminal devices. $N_3$ refers to the number of sRB groups in the subband allocated with sTTI, and M refers to the number of bits for resource allocation in the sPDCCH. Finally, the tables below may be used to find the M value using the common PDCCH. Table 1 shows $N_2$ and $N_3$ when L=2, and Table 2 shows $N_2$ and $N_3$ when L=3.

TABLE 1

|  | 00 | 01 | 10 | 11 |
|---|---|---|---|---|
| $N_2$ | $N_1$ | $[N_1/2]$ | $[N_1/4]$ | $[N_1/8]$ |
| $N_3$ | 1 | 2 | 4 | 8 |

TABLE 2

|  | 000 | 001 | 010 | 011 | 100 | 101 | 110 | 111 |
|---|---|---|---|---|---|---|---|---|
| $N_2$ | $N_1$ | $[N_1/2]$ | $[N_1/3]$ | $[N_1/4]$ | $[N_1/6]$ | $[N_1/8]$ | $[N_1/12]$ | $[N_1/16]$ |
| $N_3$ | 1 | 2 | 3 | 4 | 6 | 8 | 12 | 16 |

Referring to Table 1, since L corresponding to the number of bits of the indicator has 2 bits, M may be divided into four types of 00, 01, 10, and 11. $N_1$ and $N_3$ are obtained first, and, then, $N_2$ is obtained by performing $N_1/N_3$.

Referring to Table 2, since L corresponding to the number of bits of the indicator has 3 bits, M may be divided into 8 types of 000, 001, 010, 011, 100, 101, 110, 111. $N_1$ and $N_3$ are obtained first, and, then, $N_2$ is obtained by performing $N_1/N_3$.

Table 3 shows M values according to the resource mapping method in the sTTI.

TABLE 3

| | Direct bitmap | Contiguous allocations |
|---|---|---|
| M | $N_3$ | $[\log_2(N_3(N_3 + 1))]$ |

Referring to Table 3, the direct bitmap approach is to directly indicate a position in a bitmap of $N_3$ size to identify $N_3$ groups. In other words, a point corresponding to each sRB is indicated by the bitmap to indicate whether a resource is allocated to each sRB. Contiguous allocation approach is identify the sRB when eRBs are allocated contiguously to each other. In other words, positions of the start point and the end point in succession are indicated. This is because, when the first sRB is identified, it is determined that next sRBs are identified continuously. The terminal device may know whether to use one of the two methods during decoding using the RRC.

As a result, if it is possible in the system that L is used as either two bits or three bits, the terminal device may know the number of bits of L in the common PDCCH using the RRC. Then, among the Table 1 and Table 2 received as included in RRC in advance, one table to be used is selected using the number of bits of L. Thereafter, when receiving the common PDCCH for the sTTI, $N_2$ and $N_3$ are found based on the DCI format value of the common PDCCH. Then, the M value is finally obtained based on the resource mapping method in the sTTI as designated by the RRC.

Hereinafter, the DCI format of the common PDCCH for the method proposed above will be described in detail.

FIG. 23 and FIG. 24 show respective examples of the DCI format of the common PDCCH in the conventional TTI including the sTTI.

FIG. 23 and FIG. 24 are examples of the DCI format of the common PDCCH when L bits are used to specify the bits for resource allocation in the sPDCCH. FIG. 23 is an example applicable to a sTTI having two OFDM symbols. However, if a sTTI with three OFDM symbols does not specify a flexible sTTI using the common PDCCH, the example in FIG. 23 may be applied to the sTTI with three OFDM symbols. In FIG. 23, a DL (Downlink) sTTI subband designation field refers to a bit used for indicating a subband position to which a DL sTTI is assigned. $L_{DL}$ refers to an information bit that specifies the number of bits for resource allocation in the sPDCCH used for resource allocation in the DL sTTI. A UL (uplink) sTTI subband designation field refers to an information bit for indicating a subband position where the contention-based sTTI of the uplink is applied. $L_{UL}$ refers to an information bit that specifies the number of bits for resource allocation in the sPDCCH used for resource allocation in UL sTTI. A UL contention-based resource allocation field refers to an information bit for specifying a contention-based band when contention-based uplink transmission is allowed. The UL contention-based resource allocation field may be designated by RRC, or may not be used if the contention-based resource is not used. In this connection, $L_{DL}$ and $L_{UL}$ mean that the above-described L bits may be divided into DL and UL for transmission thereof. That is, LDL and LUL mean that L in Table 1 and 2 may have a value of 2 bits or 3 bits.

FIG. 24 is an example applicable to a sTTI having three OFDM symbols. The example of FIG. 24 is basically similar to the DCI format structure of FIG. 23, but differs therefrom in that an $F_{DL}$ is added as a first field in FIG. 24. $F_{DL}$ is an additional bit added to specify various flexible sTTIs using the common PDCCH. The presence of $F_{DL}$ is due to the fact that if the sTTI has three OFDM symbols, the design of flexible sTTI structure is allowed.

In summary, the proposed method allows not only knowing the frequency resource location of the entire sTTI but also knowing the location of the frequency resource allocated to the terminal device itself. The location of the frequency resource allocated to the terminal device itself should be known using Table 3 above. The terminal device may use the RRC to know in advance which one of the methods in Table 3 above to use. Furthermore, the terminal device may know which subcarrier used to receive the signal in the sTTI by analyzing the DL (downlink) sTTI subband designation field value or the UL (uplink) sTTI subband designation field value in FIG. 23 or FIG. 24 according to the method of Table 3.

The DCI formats of the common PDCCH of FIG. 23 and FIG. 24 may be included in the control region of the conventional sTTI as shown in FIG. 7 to FIG. 12, FIG. 18 and FIG. 19.

That is, FIG. 23 and FIG. 24 may perform communication via the following procedure.

First, terminologies will be defined. The first downlink channel includes the sPDSCH received during the sTTI and the sPDCCH scheduling the sPDSCH. The second downlink channel corresponds to the conventional PDSCH received during the conventional TTI. The downlink control channel corresponds to the common PDCCH in the conventional TTI. Furthermore, the first uplink common channel corresponds to the PUSCH of the conventional TTI, and the second uplink common channel corresponds to the sPTICH of the sTTI. Demodulating the channel corresponds to decoding the channel.

A plurality of first downlink channels included in a subframe corresponding to one conventional TTI and received during sTTI are received. The second downlink channel received during the conventional TTI is received. A plurality of the first downlink channels are received sequentially. That is, in the first sTTI, second sTTI, and third sTTI in this order, the first downlink channels are received.

Using the resource-block indicator delivered using the downlink control channel of the control region containing the first symbol of the subframe, information about the resource block used for the first downlink channel is obtained. The resource-block indicator indicates the resource block using which the sPDCCH containing the resource allocation information for the specific terminal device is transferred. That is, the indicator indicates the number of bits for resource allocation in the sPDCCH. Furthermore, the resource-block indicator is included in the DCI field included in the common PDCCH. Thus, the indicator may be considered to be transmitted using the downlink control channel. The DCI field of the common PDCCH indicates a resource block using which the plurality of the first downlink channels are transmitted. The DCI field indicates the resource block transmitted during all sTTIs for all terminal devices as well as the specific terminal device itself.

Then, an RRC message is received that determines the rule by which the resource block is indicated by the resource-block indicator. That is, a table capable of mapping the number of resource allocation bits is received. The rule corresponds to the information in Tables 1 and 2 of this specification.

The plurality of the first downlink channels are demodulated using information about resource blocks used for the first downlink channels. This means that the terminal device may demodulate its sPDCCH using the resource-block indicator, thereby demodulating the sPDSCH. Information on the resource blocks used for the first downlink channels corresponds to information on the M value in Table 3 of this specification. The second downlink channel is then demodulated using the downlink control channel. This means that the common PDCCH of the conventional TTI is used to demodulate the PDSCH of the conventional TTI.

Furthermore, the resource-block indicator indicates the total number of resource blocks used for the first downlink channel, the number of resource block groups containing the resource block, and the number of resource blocks included in the resource block group. The number of bits for frequency resource allocation in the control region of the sTTI may be determined by bit-mapping the number of resource block groups per each resource block. That is, the above-described parameters are required to decode the sPDCCH in the control region of the sTTI, and the sPDCCH is decoded using the number of bits for frequency resource allocation.

In addition, the DCI includes a field for specifying a frequency resource used for the first downlink channel, and a field for specifying a frequency resource used for the second uplink common channel. That is, positions of frequency resources in uplink and downlink sTTI may be known using the specification fields included in the DCI. In addition, the DCI further includes a field for indicating contention-based frequency resources for uplink transmission based on the contention.

2. Method for Change Information in sPDCCH with Considering Channel Characteristics In this connection, there is provide a method of reducing the amount of information bits in the sPDCCH with considering the channel characteristics. The conventional TTI is designed to change the Modulation and Coding Scheme (MCS) level and Transmit Power Control (TPC) every TTI. However, since sTTI needs to design sPDCCH compactly, and the sTTI is shorter than the length of channel change, there is no need to always change MCS and TPC.

Generally, the number of bits in a transport block, which is a unit for transmitting signals in the physical layer, is determined as follows. First, the number of resources (i.e., the number of RBs) that can be allocated to the terminal device is determined, and the MCS level at which the signals may be transmitted while satisfying the target PER (Packet Encoding Rule) is determined. The number of bits in the transport block may be calculated using the MCS level and the number of RBs. If the terminal device receives a signal in a specific sTTI using a RB resource, and then receive a signal in the next sTTI using the same RB resource, the device may assume the same channel even when the sTTI changes, and maintain the MCS level as it is. If the terminal device receives a signal using a new RB resource in the next sTTI, the MCS level may change. Thus, the number of bits may be required to represent the MCS level change. However, since the change in the channel within the frequency band allocated to the sTTI is not large, the MCS level may be represented using the smaller number of bits together with using the MCS information received earlier. This feature may be equally applied to TPC. That is, if the total information of the MCS/TPC is informed every sTTI, the resource waste is severe. Thus, accurate MCS/TPC information is informed at a specific period, and only the change value (delta) is informed at the remaining periods.

In the following, a method of reducing the number of bits in the sPDCCH using the above feature is proposed.

Figure 25:
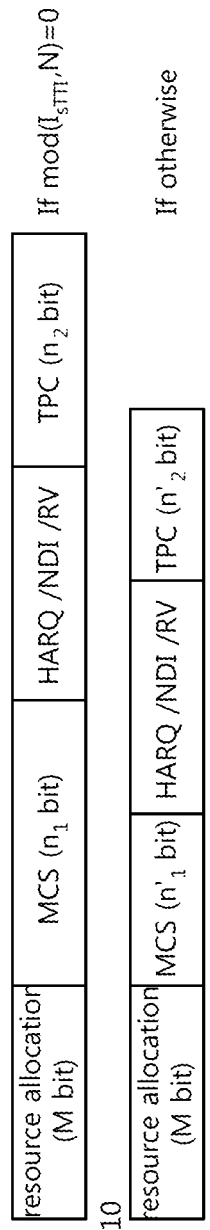
FIG. 25 shows an example of a DCI format of a periodic sPDCCH.

FIG. 25 shows an example of the DCI format of a periodic sPDCCH.

As opposed to changing the DCI format of the common PDCCH as in FIG. 23 and FIG. 24, the number of bits in the sPDCCH is reduced by changing the DCI format of the periodic sPDCCH in an approach of FIG. 25. This proposed method first informs a MCS level and TPC information using n1 bits and n2 bits, respectively. Second, during subsequent N sTTIs, n1' bits and n2' bits are used respectively to inform the MCS level and TPC information. In this connection. $0 \le n1' < n1$, and $0 \le n2' < n2$. Third, in the (N+1)-th sTTI, using the n1 bits and n2 bits again, the MCS level and TPC information are informed. Fourth, the base station may inform the terminal device of the N value and the values of n1' and n2' using the RRC or SIB (System Information Block) or the PDCCH.

In this connection, N represents a period, and the DCI format of sPDCCH is changed every N sTTIs. The $I_{sTTI}$ indicates a sTTI index after information is newly transmitted. In this connection, the information is newly transmitted means that there is no transmission of information during the N sTTIs preceding the sTTI in which the information begins to be transmitted. The $I_{sTTI}$ becomes 0 when information is newly transmitted. Thereafter, the $I_{sTTI}$ is incremented by 1 every sTTI. The example of FIG. 25 may be equally applicable to both uplink and downlink.

The DCI format of the sPDCCH of FIG. 25 may be included in the sCR in each sTTI as shown in FIG. 7 to FIG. 12, FIG. 18 and FIG. 19.

That is, FIG. 25 may perform communication via the following procedure.

First, terminologies will be defined. The first downlink channel includes the sPDSCH received during the sTTI and the sPDCCH scheduling the sPDSCH. The second downlink channel corresponds to the conventional PDSCH received during the conventional TTI. The downlink control channel corresponds to the common PDCCH in the conventional TTI. Demodulating the channel corresponds to decoding the channel.

A plurality of first downlink channels included in a subframe corresponding to one conventional TTI and received during sTTI are received. The second downlink channel received during the conventional TTI is received. A plurality of the first downlink channels are received sequentially. That is, in the first sTTI, second sTTI, and third sTTI in this order, the first downlink channels are received.

Using the resource-block indicator delivered using the downlink control channel of the control region containing the first symbol of the subframe, information about the resource block used for the first downlink channels is obtained. The resource-block indicator indicates the resource block using which the sPDCCH containing the resource allocation information for the specific terminal device is transferred. That is, the indicator indicates the number of bits for resource allocation in the sPDCCH. Furthermore, the resource-block indicator is included in the DCI field included in the common PDCCH. Thus, the indicator may be considered to be transmitted using the downlink control channel. The DCI field of the common PDCCH indicates a resource block using which the plurality of the first downlink channels are transmitted. The DCI field indicates the resource block transmitted during all sTTIs for all terminal devices as well as the specific terminal device itself.

Then, an RRC message is received that determines the rule by which the resource block is indicated by the resource-block indicator. That is, a table capable of mapping the number of resource allocation bits is received. The rule corresponds to the information in Tables 1 and 2 of this specification.

The plurality of the first downlink channels are demodulated using information about resource blocks used for the first downlink channels. This means that the terminal device may demodulate its sPDCCH using the resource-block indicator, thereby demodulating the sPDSCH. Information on the resource blocks used for the first downlink channels corresponds to information on the M value in Table 3 of this specification. The second downlink channel is then demodulated using the downlink control channel. This means that the common PDCCH of the conventional TTI is used to demodulate the PDSCH of the conventional TTI.

Further, the sPDCCH includes MCS or TPC information, and the sPDCCH received at a predetermined time point indicates only the change amount of MCS or TPC information. This is a method of reducing the amount of information bits of the sPDCCH itself, rather than the method of using the common PDCCH. That is, if the total information of the MCS/TPC is informed every sTTI, the resource waste is severe. Thus, accurate MCS/TPC information is informed at a specific period, and only the change value (delta) is informed at the remaining periods.

Furthermore, the resource-block indicator indicates the total number of resource blocks used for the first downlink channel, the number of resource block groups containing the resource block, and the number of resource blocks included in the resource block group. The number of bits for frequency resource allocation in the control region of the sTTI may be determined by bit-mapping the number of resource block groups per each resource block. That is, the above-described parameters are required to decode the sPDCCH in the control region of the sTTI, and the sPDCCH is decoded using the number of bits for frequency resource allocation.

3. Method for Changing PUCCH Transmission Scheme Based on Information Characteristics In this connection, in accordance with the present method, the scheduling request and the ACK/NACK are transmitted over the sTTI, but the CQI (Channel Quality Information) is transmitted over the conventional TTI. This is because the channel quality value such as the CQI is determined based on the channel change rate, and thus it is not necessary to transmit the channel quality value information such as CQI over the sTTI quickly. If the CQI is transmitted over the sPUCCH, a signal may be transmitted using a plurality of sRBs due to a shortage of information transmission channels in the corresponding sTTI. However, applying the proposed method leads to the advantage that fewer resources may be allocated to the sPUCCH.

That is, in order to apply the proposed method, a new indexing method is required, which is configured to designate the CQI to be transmitted on the conventional PUCCH and to designate the scheduling request and ACK/NACK to be transmitted on the sPUCCH. Furthermore, the CQI that is transmitted non-periodically at the request of the base station may be transmitted on the sPUSCH.

This embodiment may perform communication via the following procedure.

First, terminologies will be defined. The first downlink channel includes the sPDSCH received during the sTTI and the sPDCCH scheduling the sPDSCH. The second downlink channel corresponds to the conventional PDSCH received during the conventional TTI. The downlink control channel corresponds to the common PDCCH in the conventional TTI. Further, a first uplink common channel corresponds to a PUSCH of the conventional TTI, and a second uplink common channel corresponds to a sPTICH of the sTTI. Demodulating the channel corresponds to decoding the channel.

A plurality of first downlink channels included in a subframe corresponding to one conventional TTI and received during sTTI are received. The second downlink channel received during the conventional TTI is received. A plurality of the first downlink channels are received sequentially. That is, in the first sTTI, second sTTI, and third sTTI in this order, the first downlink channels are received.

Using the resource-block indicator delivered using the downlink control channel of the control region containing the first symbol of the subframe, information about the resource block used for the first downlink channels is obtained. The resource-block indicator indicates the resource block using which the sPDCCH containing the resource allocation information for the specific terminal device is transferred. That is, the indicator indicates the number of bits for resource allocation in the sPDCCH. Furthermore, the resource-block indicator is included in the DCI field included in the common PDCCH. Thus, the indicator may be considered to be transmitted using the downlink control channel. The DCI field of the common PDCCH indicates a resource block using which the plurality of the first downlink channels are transmitted. The DCI field indicates the resource block transmitted during all sTTIs for all terminal devices as well as the specific terminal device itself.

Then, an RRC message is received that determines the rule by which the resource block is indicated by the resource-block indicator. That is, a table capable of mapping the number of resource allocation bits is received. The rule corresponds to the information in Tables 1 and 2 of this specification.

The plurality of the first downlink channels are demodulated using information about resource blocks used for the first downlink channels. This means that the terminal device may demodulate its sPDCCH using the resource-block indicator, thereby demodulating the sPDSCH. Information on the resource blocks used for the first downlink channels corresponds to information on the M value in Table 3 of this specification. The second downlink channel is then demodulated using the downlink control channel. This means that the common PDCCH of the conventional TTI is used to demodulate the PDSCH of the conventional TTI.

Further, the sPDCCH includes MCS or TPC information, and the sPDCCH received at a predetermined time point indicates only the change amount of MCS or TPC information. This is a method of reducing the amount of information bits of the sPDCCH itself, rather than the method of using the common PDCCH. That is, if the total information of the MCS/TPC is informed every sTTI, the resource waste is severe. Thus, accurate MCS/TPC information is informed at a specific period, and only the change value (delta) is informed at the remaining periods.

Furthermore, the control region of the conventional TTI contains scheduling information for the first uplink common channel in a fourth subframe after the same subframe. The control region in the sTTI contains scheduling information for the second uplink common channel in the same subframe. The first uplink common channel and the second uplink common channel are allocated to different frequency bands. The common PDCCH in the control region of the conventional TTI indicates the scheduling of the PUSCH in the uplink of the fourth subframe after the same subframe.

The sPDCCH of the control region in the sTTI indicates the scheduling of the sPUSCH in the uplink of the same subframe.

Furthermore, the first uplink common channel may be used to transmit the CQI, and the second uplink common channel may be used to transmit the ACK/NACK signal.

4. Method for Reducing Retransmission Signal

Figure 26:
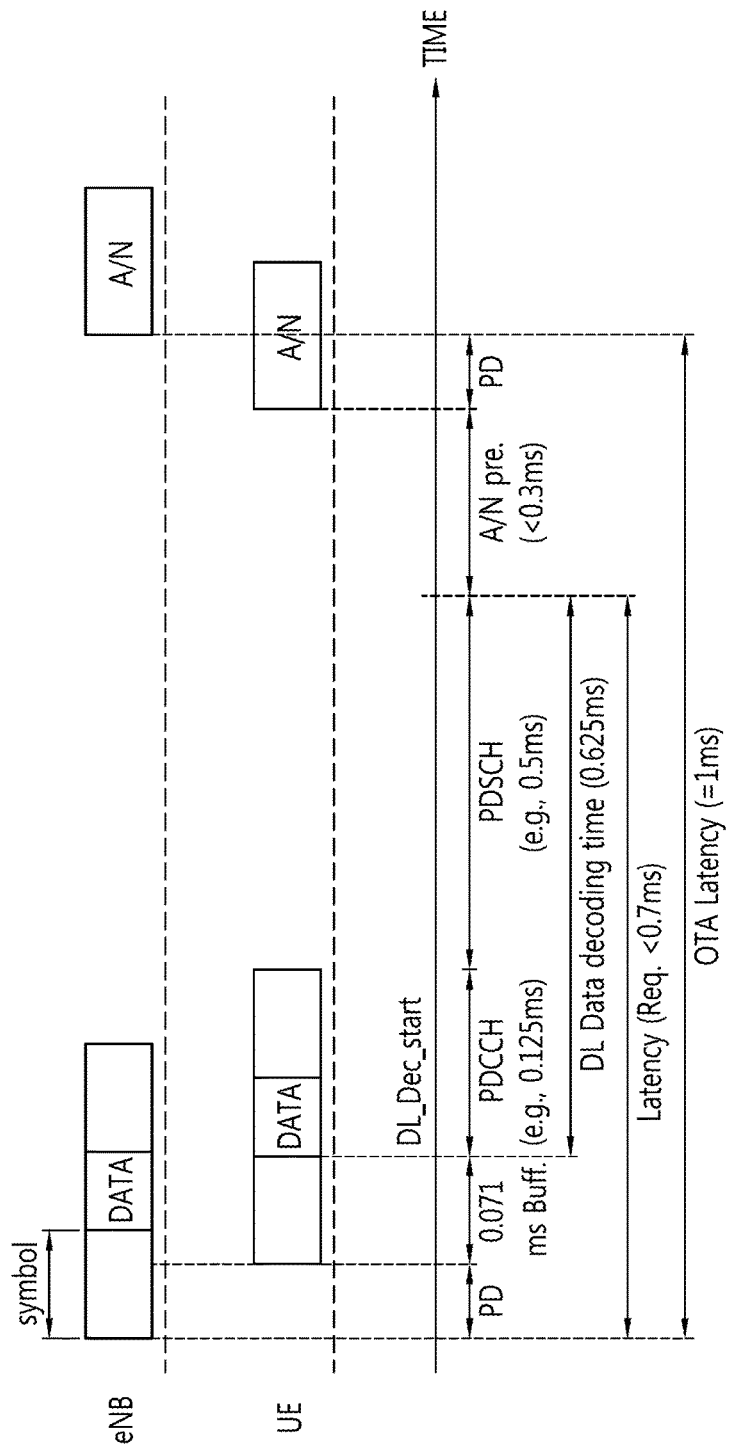
FIG. 26 shows OTA delay when applying a conventional TTI with three OFDM symbols.

FIG. 26 shows OTA delay when applying a conventional TTI with three OFDM symbols.

In this connection, a method of reducing the size of the retransmission signal in sTTI is proposed. Referring to FIG. 26, in a 1 ms low latency communication requiring an OTA (Over The Air) delay time of 1 ms or less, when retransmission of an ACK/NACK signal is performed after receiving the ACK/NACK signal, a delay time of 1 ms or less may be not satisfied. Accordingly, in the following, a method of continuously transmitting the ACK/NACK signal until a base station receives the ACK/NACK signal is proposed.

Figure 27:
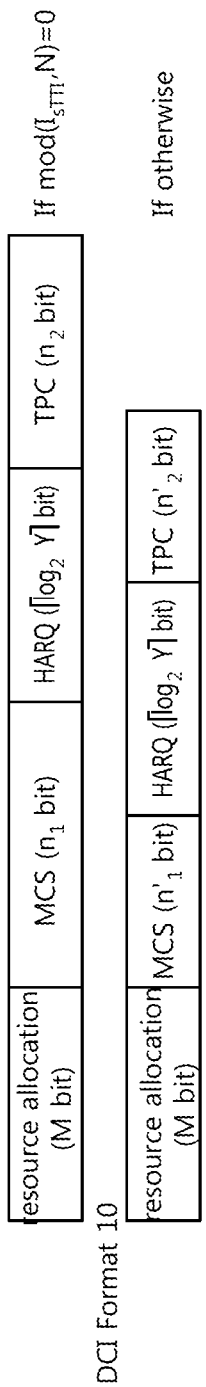
FIG. 27 shows an example of a DCI format of a sPDCCH according to a retransmission method.
Figure 28:
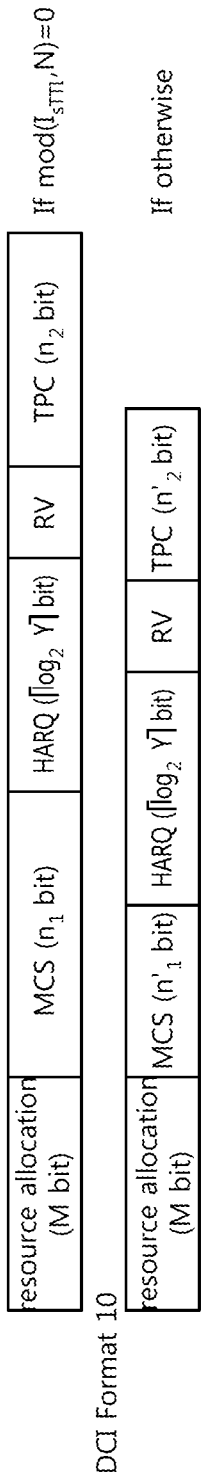
FIG. 28 shows an example of a DCI format of a sPDCCH according to a retransmission method.

FIG. 27 shows an example of a DCI format of a sPDCCH according to a retransmission method. FIG. 28 shows an example of a DCI format of a sPDCCH according to a retransmission method.

The operation sequence of the proposed method is as follows.

First, the base station transmits a signal to the terminal device at a specific sTTI.

Second, if it is determined that another terminal device is free of a signal to be transmitted in the next sTTI, or if it is determined that the signal received by the terminal device is high in importance, the base station retransmits the same signal to the corresponding terminal device in the next sTTI. That is, retransmission of the ACK is performed by the base station before the ACK is received by the base station, and the retransmission is indicated by a NDI (New Data Indicator) field. This NDI field is included in a HARQ field in a sPDCCH DCI format as shown in FIG. 27. The $\log_2 Y$ in the HARQ field indicates that if there is a $\log_2 Y$ bit, Y HARQ processes may be identified.

Third, in the same manner as the second operation, total X retransmissions may be performed, and a single terminal device may have up to Y transmission processes (HARQ process number).

When Y=1, if retransmission is performed toward the corresponding terminal device, new information cannot be transmitted. This is because there is only one HARQ process, and, thus, retransmission and new transmission cannot be performed at the same time.

When Y=2, new information may be transmitted while performing retransmission toward the corresponding terminal device. Alternatively, two retransmissions toward the terminal device at the same time may be executed.

In this connection, the terminal device should perform blind decoding until total Y sPDCCHs in a single sTTI are decoded.

Fourth, the terminal device stops retransmission when having received the ACK/NACK signal or when the total X retransmissions are achieved.

FIG. 27 and FIG. 28 illustrate respective examples of the DCI format of the sPDCCH according to the period, like FIG. 25. FIG. 27 illustrates an example of the DCI format of the sPDCCH when chase combining is applied. FIG. 28 illustrates an example of the DCI format of the sPDCCH when the IR (Incremental Redundancy) retransmission method is applied. The chase combining scheme attempts to decode by combining an original packet with errors and a retransmission packet. The IR method is to realize retransmission together with increasing a channel coding gain for each retransmission. In order to satisfy the 1 ms OTA delay in FIG. 26, in as for the sTTI having three OFDM symbols or two OFDM symbols, Y=2, while as for the sTTI with one OFDM symbol, up to Y=6 may be possible.

Further, as with the example of FIG. 25, accurate MCS/TPC information is informed at a specific period, and only the change value (delta) is informed at the remaining periods. More specifically, this proposed method first informs a MCS level and TPC information using n1 bits and n2 bits, respectively. Second, during subsequent N sTTIs, n1' bits and n2' bits are used respectively to inform the MCS level and TPC information. In this connection. $0 \le n1' < n1$, and $0 \le n2' < n2$. Third, in the (N+1)-th sTTI, using the n1 bits and n2 bits again, the MCS level and TPC information are informed. Fourth, the base station may inform the terminal device of the N value and the values of n1' and n2' using the RRC or SIB (System Information Block) or the PDCCH.

In this connection, N represents a period, and the DCI format of sPDCCH is changed every N sTTIs. The $I_{sTTI}$ indicates a sTTI index after information is newly transmitted. In this connection, the information is newly transmitted means that there is no transmission of information during the N sTTIs preceding the sTTI in which the information begins to be transmitted. The $I_{sTTI}$ becomes 0 when information is newly transmitted. Thereafter, the $I_{sTTI}$ is incremented by 1 every sTTI. The examples of FIG. 27 and/or FIG. 28 may be equally applicable to both uplink and downlink.

The DCI formats of the sPDCCH of FIG. 27 and/or FIG. 28 may be included in the sCR in each sTTI as shown in FIG. 7 to FIG. 12, FIG. 18 and FIG. 19.

That is, the examples of FIG. 27/and/or FIG. 28 may perform communication via the following procedure.

First, terminologies will be defined. The first downlink channel includes the sPDSCH received during the sTTI and the sPDCCH scheduling the sPDSCH. The second downlink channel corresponds to the conventional PDSCH received during the conventional TTI. The downlink control channel corresponds to the common PDCCH in the conventional TTI. Demodulating the channel corresponds to decoding the channel.

A plurality of first downlink channels included in a subframe corresponding to one conventional TTI and received during sTTI are received. The second downlink channel received during the conventional TTI is received. A plurality of the first downlink channels are received sequentially. That is, in the first sTTI, second sTTI, and third sTTI in this order, the first downlink channels are received.

Using the resource-block indicator delivered using the downlink control channel of the control region containing the first symbol of the subframe, information about the resource block used for the first downlink channels is obtained. The resource-block indicator indicates the resource block using which the sPDCCH containing the resource allocation information for the specific terminal device is transferred. That is, the indicator indicates the number of bits for resource allocation in the sPDCCH. Furthermore, the resource-block indicator is included in the DCI field included in the common PDCCH. Thus, the indicator may be considered to be transmitted using the downlink control channel. The DCI field of the common PDCCH indicates a resource block using which the plurality of the first downlink channels are transmitted. The DCI field indicates the resource block transmitted during all sTTIs for all terminal devices as well as the specific terminal device itself.

Then, an RRC message is received that determines the rule by which the resource block is indicated by the resource-block indicator. That is, a table capable of mapping the number of resource allocation bits is received. The rule corresponds to the information in Tables 1 and 2 of this specification.

The plurality of the first downlink channels are demodulated using information about resource blocks used for the first downlink channels. This means that the terminal device may demodulate its sPDCCH using the resource-block indicator, thereby demodulating the sPDSCH. Information on the resource blocks used for the first downlink channels corresponds to information on the M value in Table 3 of this specification. The second downlink channel is then demodulated using the downlink control channel. This means that the common PDCCH of the conventional TTI is used to demodulate the PDSCH of the conventional TTI.

Further, the sPDCCH includes MCS or TPC information, and the sPDCCH received at a predetermined time point indicates only the change amount of MCS or TPC information. This is a method of reducing the amount of information bits of the sPDCCH itself, rather than the method of using the common PDCCH. That is, if the total information of the MCS/TPC is informed every sTTI, the resource waste is severe. Thus, accurate MCS/TPC information is informed at a specific period, and only the change value (delta) is informed at the remaining periods Furthermore, the resource-block indicator indicates the total number of resource blocks used for the first downlink channel, the number of resource block groups containing the resource block, and the number of resource blocks included in the resource block group. The number of bits for frequency resource allocation in the control region of the sTTI may be determined by bit-mapping the number of resource block groups per each resource block. That is, the above-described parameters are required to decode the sPDCCH in the control region of the sTTI, and the sPDCCH is decoded using the number of bits for frequency resource allocation.

Furthermore, the control region of the sTTI includes the HARQ field, which includes a NDI (New Data Indicator) field, by which retransmission of the ACK/NACK is performed by the base station before the ACK/NACK is received by the base station. The $\log_2 Y$ in the HARQ field indicates that if there is a $\log_2 Y$ bit, the retransmissions may be executed during Y HARQ processes.

Figure 29:
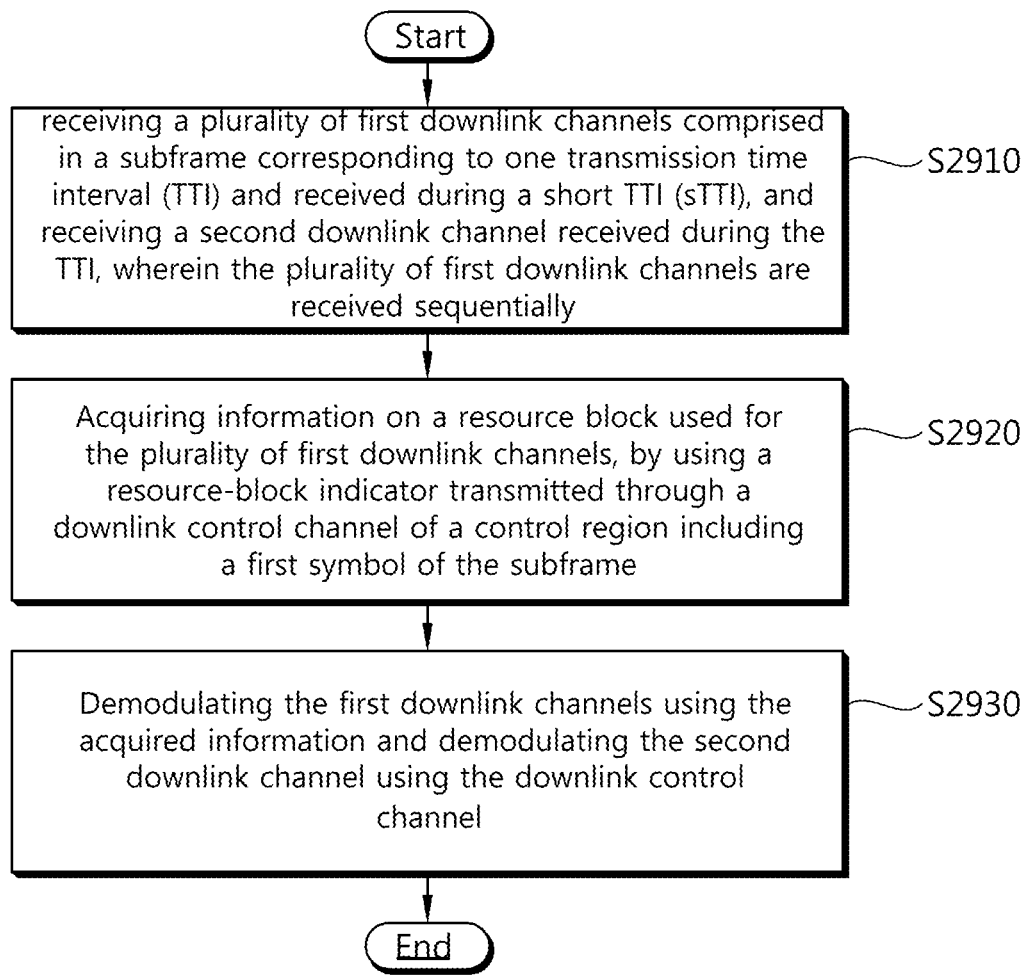
FIG. 29 is a flowchart illustrating a method of performing communication by dynamically allocating a number of bits for resource allocation in a sPDCCH using a common PDCCH.

FIG. 29 is a flowchart illustrating a method of performing communication by dynamically allocating a number of bits for resource allocation in a sPDCCH using a common PDCCH.

Hereinafter, a first downlink channel includes a sPDSCH that is received during the sTTI and a sPDCCH that schedules the sPDSCH. A second downlink channel corresponds to a conventional PDSCH received during the conventional TTI. A downlink control channel corresponds to a common PDCCH in the conventional TTI. Demodulating the channel corresponds to decoding the channel.

Referring to FIG. 29, at an operation S2910, a plurality of first downlink channels included in the subframe corresponding to one conventional TTI and received during the sTTI are received, and a second downlink channel received during the conventional TTI is received. A plurality of the first downlink channels are received sequentially. That is, in the first sTTI, second sTTI, and third sTTI in this order, the first downlink channels are received.

Next, at an operation S2920, information on a resource block used for a plurality of the first downlink channels is obtained by using a resource-block indicator transmitted on the downlink control channel of a control region including a first symbol of a subframe. The resource-block indicator indicates the number of bits for resource allocation in the sPDCCH of the sTTI. In addition, the resource-block indicator is included in the DCI field included in the common PDCCH. Thus, the resource-block indicator may be considered to be transmitted using the downlink control channel.

Subsequently, at an operation S2930, a plurality of the first downlink channels are demodulated using information about the resource blocks used for the first downlink channel. This means that the terminal device may demodulate its sPDCCH using the resource-block indicator and, thus, demodulate the sPDSCH. The information on a resource block used for the plurality of the first downlink channels eventually corresponds to information on the M value in Table 3 of the present specification. Further, the second downlink channel is demodulated using the downlink control channel. This means that the common PDCCH of the conventional TTI is used demodulate to the PDSCH of the conventional TTI.

Figure 30:
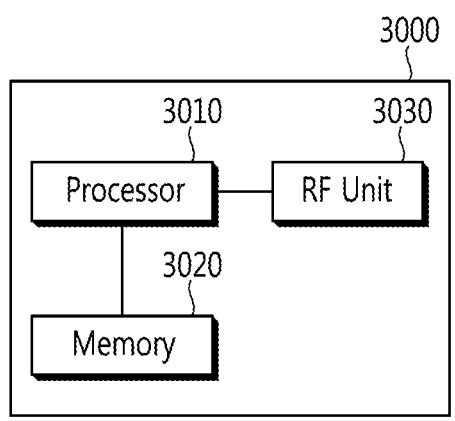
FIG. 30 is a block diagram showing a device for wireless communication for implementing an embodiment of the present invention.

FIG. 30 is a block diagram showing a device for wireless communication for implementing an embodiment of the present invention.

The device 3000 for wireless communication includes a processor 3010, a memory 3020 and a radio frequency (RF) unit 3030.

The processor 3010 may be configured to implement proposed functions, procedures and/or methods described in this description. Layers of the radio interface protocol may be implemented in the processor 3010. The processor 3010 may handle a procedure explained above. The memory 3020 is operatively coupled with the processor 3010, and the RF unit 3030 is operatively coupled with the processor 3010.

The processor 3010 may include application-specific integrated circuit (ASIC), other chipset, logic circuit and/or data processing device. The memory 3020 may include read-only memory (ROM), random access memory (RAM), flash memory, memory card, storage medium and/or other storage device. The RF unit 3030 may include baseband circuitry to process radio frequency signals. When the embodiments are implemented in software, the techniques described herein can be implemented with modules (e.g., procedures, functions, and so on) that perform the functions described herein. The modules can be stored in memory 3020 and executed by processor 3010. The memory 3020 can be implemented within the processor 3010 or external to the processor 3010 in which case those can be communicatively coupled to the processor 3010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for performing communication by a first device among a plurality of devices in a wireless communication system, the method comprising:
   receiving a radio resource control (RRC) message including first information, second information and third information,
   wherein the first information is related to a number of first resource blocks (RBs) allocated during short transmission time intervals (sTTIs),
   wherein the second information is related to a format of a plurality of first downlink channels,
   wherein the third information is related to a resource mapping method in the sTTIs, and
   wherein the sTTIs are shorter than a TTI which is related to a subframe;
   receiving, during the TTI, fourth information on an indicator for resource allocation bits in the plurality of the first downlink channels through a common control channel for the plurality of the devices,
   wherein the resource allocation bits are dynamically determined based on the first to fourth information, wherein a number of the resource allocation bits is related to a number of second devices that can be allocated in the first RBs,
   wherein the first device is included in the second devices;
   acquiring allocation information on second RBs for the first device among the first RBs based on the resource allocation bits;
   receiving, during the sTTIs, the resource allocation bits through the plurality of the first downlink channels for scheduling uplink data and downlink data; and
   transmitting the uplink data in the second RBs during the sTTIs, or receiving the downlink data in the second RBs during the sTTIs.

2. The method of claim 1, wherein the common control channel includes a Physical Downlink Control Channel (PDCCH), wherein each of the plurality of first downlink channels includes a Short PDCCH (sPDCCH).

3. The method of claim 2, wherein the fourth information is included in a Downlink Control Information (DCI) field included in the PDCCH.

4. The method of claim 2, wherein a DCI field of the PDCCH includes information on the first RBs.

5. The method of claim 2, wherein the sPDCCH includes Modulation and Coding Scheme (MCS) or Transmitter Power Control (TPC) information.

6. The method of claim 5, wherein the sPDCCH received at a predetermined time point includes only information on a change amount of the MCS or TPC information.

7. The method of claim 1, wherein each of the first downlink channels is received using the same number of symbols.

8. The method of claim 1, wherein each of the symbols includes an Orthogonal Frequency Division Multiplexing (OFDM) symbol or a Single-Carrier Frequency Division Multiple Access (SC-FDMA) symbol.

9. A first device for performing communication by a first device among a plurality of devices in a wireless communication system, the first device comprising:
   a transmitter and receiver; and
   a processor, operatively coupled to the transmitter and receiver, wherein the processor is configured to:
   control the receiver to receive a radio resource control (RRC) message including first information, second information and third information,
   wherein the first information is related to a number of first resource blocks (RBs) allocated during short transmission time intervals (sTTIs),
   wherein the second information is related to a format of a plurality of first downlink channels,
   wherein the third information is related to a resource mapping method in the sTTIs, and
   wherein the sTTIs are shorter than a TTI which is related to a subframe;
   control the receiver to receive, during the TTI, fourth information on an indicator for resource allocation bits in the plurality of the first downlink channels through a common control channel for the plurality of the devices,
   wherein the resource allocation bits are dynamically determined based on the first to fourth information,
   wherein a number of the resource allocation bits is related to a number of second devices that can be allocated in the first RBs,
   wherein the first device is included in the second devices;
   acquire allocation information on second RBs for the first device among the first RBs based on the resource allocation bits;
   control the receiver to receive, during the sTTIs, the resource allocation bits through the plurality of the first downlink channels for scheduling uplink data and downlink data; and
   control the transmitter to transmit the uplink data in the second RBs during the sTTIs, or control the receiver to receive the downlink data in the second RBs during the sTTIs.

* * * * *